US008248298B2

(12) United States Patent
Lalezari

(10) Patent No.: US 8,248,298 B2
(45) Date of Patent: Aug. 21, 2012

(54) ORTHOGONAL LINEAR TRANSMIT RECEIVE ARRAY RADAR

(75) Inventor: Farzin Lalezari, Boulder, CO (US)

(73) Assignee: First RF Corporation, Boulder, CO (US)

(*) Notice: Subject to any disclaimer, the term of this patent is extended or adjusted under 35 U.S.C. 154(b) by 192 days.

(21) Appl. No.: 12/610,318

(22) Filed: Oct. 31, 2009

(65) Prior Publication Data

US 2010/0141527 A1 Jun. 10, 2010

Related U.S. Application Data

(60) Provisional application No. 61/110,518, filed on Oct. 31, 2008.

(51) Int. Cl.
*G01S 13/08* (2006.01)
*G01S 13/00* (2006.01)
*H01Q 3/00* (2006.01)
*H01Q 21/08* (2006.01)

(52) U.S. Cl. ........ 342/179; 342/120; 342/188; 343/757; 343/758; 343/824

(58) Field of Classification Search .................... 342/22, 342/118, 120, 179, 188; 343/730, 747, 757, 343/758, 763, 824, 830
See application file for complete search history.

(56) References Cited

U.S. PATENT DOCUMENTS

| | | | | |
|---|---|---|---|---|
| 2,713,161 | A * | 7/1955 | Fiske | 342/371 |
| 3,296,579 | A * | 1/1967 | Farr et al. | 367/88 |
| 3,521,286 | A * | 7/1970 | Kuecken | 343/730 |
| 3,528,070 | A * | 9/1970 | Young, Jr. | 342/67 |
| 3,618,105 | A * | 11/1971 | Bruene et al. | 343/747 |
| 3,836,976 | A * | 9/1974 | Monser et al. | 343/795 |
| 3,842,417 | A * | 10/1974 | Williams | 342/158 |
| 4,121,190 | A * | 10/1978 | Edgerton et al. | 367/106 |
| 4,314,251 | A * | 2/1982 | Raab | 342/463 |
| 4,317,119 | A * | 2/1982 | Alvarez | 342/455 |
| 4,336,540 | A * | 6/1982 | Goodwin et al. | 342/157 |
| 4,949,310 | A * | 8/1990 | Smith et al. | 367/7 |
| 5,146,234 | A * | 9/1992 | Lalezari | 343/895 |
| 5,323,362 | A * | 6/1994 | Mitchell et al. | 367/104 |
| 5,517,206 | A * | 5/1996 | Boone et al. | 343/806 |
| 5,748,146 | A * | 5/1998 | Grove et al. | 342/372 |
| 5,966,102 | A * | 10/1999 | Runyon | 343/820 |
| 6,067,053 | A * | 5/2000 | Runyon et al. | 343/797 |
| 6,084,827 | A * | 7/2000 | Johnson et al. | 367/103 |
| 6,111,542 | A * | 8/2000 | Day et al. | 342/359 |
| 6,552,691 | B2 * | 4/2003 | Mohuchy et al. | 343/770 |
| 6,690,917 | B2 * | 2/2004 | Soliman et al. | 455/12.1 |
| 7,277,053 | B2 * | 10/2007 | Riel et al. | 342/432 |
| 7,280,068 | B2 * | 10/2007 | Lee et al. | 342/22 |
| 7,283,085 | B2 * | 10/2007 | Lee et al. | 342/6 |
| 7,436,370 | B2 * | 10/2008 | Blanton | 343/756 |

(Continued)

*Primary Examiner* — Jack W Keith
*Assistant Examiner* — Peter Bythrow
(74) *Attorney, Agent, or Firm* — IntelleTech PLLC; Katharine I. Matthews

(57) ABSTRACT

A radar system having orthogonal antenna apertures is disclosed. The invention further relates to an antenna system wherein the orthogonal apertures comprise at least one transmit aperture and at least one receive aperture. The cross-product of the transmit and receive apertures provides a narrow spot beam and resulting high resolution image. An embodiment of the invention discloses orthogonal linear arrays, comprising at least one electronically scanned transmit linear array and at least one electronically scanned receive linear array. The design of this orthogonal linear array system produces comparable performance, clutter and sidelobe structure at a fraction of the cost of conventional 2D filled array antenna systems.

16 Claims, 18 Drawing Sheets

U.S. PATENT DOCUMENTS 7,746,267 B2 * 6/2010 Raney .......................... 342/25 F
7,817,096 B2 * 10/2010 Linehan ........................ 343/757
7,978,120 B2 * 7/2011 Longstaff ........................ 342/22
2006/0214832 A1 * 9/2006 Lee et al. ........................ 342/22
2006/0214835 A1 * 9/2006 Lee et al. ........................ 342/22
2006/0214836 A1 * 9/2006 Baharav et al. ................. 342/22
2010/0141527 A1 * 6/2010 Lalezari ........................ 342/368

* cited by examiner 2x 1D orthogonal linear array length compared to 2D filled array

1

1.1

1.2

1.3

1.4

1.5

Comparison of Sinu/u vs. (Sinv/v)²

Single Vertical Aperture Projected onto the ground
D = 150m above ground
In units of received power on ground 0° Steer 15° Steer 30° Steer 45° Steer Single Horizontal Aperture Projected onto the ground
D = 150m above ground
In units of received power on ground 0° Steer 15° Steer 30° Steer 45° Steer Combined OLTRA architecture
D = 150m above ground
In units of received power at target (0°, 0°) Steer Two 1x24 Element Array System 5

(0°, 0°) Steer

16x16 Element Array (0°, 15°) Steer

Two 1x24 Element Array System 5

(0°, 15°) Steer

16x16 Element Array

Combined OLTRA architecture
D = 150m above ground
In units of received power at target (0°, 30°) Steer Two 1x24 Element Array System 5

(0°, 30°) Steer

16x16 Element Array (0°, 45°) Steer

Two 1x24 Element Array System 5

(0°, 45°) Steer

16x16 Element Array

Combined OLTRA architecture
D = 150m above ground
In units of received power at target (15°, 15°) Steer Two 1x24 Element Array System 5

(15°, 15°) Steer

16x16 Element Array (15°, 30°) Steer

Two 1x24 Element Array System 5

(15°, 30°) Steer

16x16 Element Array

Combined OLTRA architecture
D = 150m above ground
In units of received power at target (15°, 45°) Steer Two 1x24 Element Array System 5

(15°, 45°) Steer

16x16 Element Array (30°, 30°) Steer

Two 1x24 Element Array System 5

(30°, 30°) Steer

16x16 Element Array

Combined OLTRA architecture
D = 150m above ground
In units of received power at target (30°, 45°) Steer Two 1x24 Element Array System 5

(30°, 45°) Steer

16x16 Element Array (45°, 45°) Steer

Two 1x24 Element Array System 5

(45°, 45°) Steer

16x16 Element Array

ORTHOGONAL LINEAR TRANSMIT RECEIVE ARRAY RADAR

CROSS REFERENCE TO RELATED APPLICATIONS

This application is related to and claims the benefit of prior-filed U.S. Provisional Application for Patent Ser. No. 61/110,518 filed on 31 Oct. 2008, entitled "Orthogonal Linear Transmit Receive Array Radar," which is incorporated herein by reference.

FIELD OF THE INVENTION

The present invention relates to a sensing system having an antenna system with orthogonal apertures, and more particularly, to an antenna system wherein the orthogonal apertures comprise at least one transmit aperture and at least one receive aperture. The cross-product of the transmit and receive apertures provides a narrow spot beam and therefore, a high resolution image that is desirable for many defense and commercial applications. The present invention further discloses an embodiment having orthogonal linear arrays, comprising at least one electronically scanned transmit linear array and at least one electronically scanned receive linear array. The design of the orthogonal linear array system of the present invention produces comparable performance, clutter and sidelobe structure at a fraction of the cost of conventional 2D filled array antenna systems.

BACKGROUND OF THE INVENTION

Sensing devices having orthogonal arrays are well known in the art for radars, sonars and microphones. A pioneering design, the Mills Cross, was built in the 1950s in Australia and utilized in a telescope comprising 250 dipole elements on two 1500 foot long arms, one running North-South and the other running East-West. Multiplying the voltages of the two arms produced a pencil beam with substantial sidelobes, and by adjusting the phasing of the elements in each arm, the telescope beam could be steered across the sky. Other systems utilizing the Mills Cross design include a Doppler radar in Norway, described by Singer et al. in "A New Narrow Beam Doppler Radar at 3 MHz for Studies of the High-Latitude Middle Atmosphere," and "A New Narrow Beam MF Radar at 3 MHz for Studies of the High-Latitude Middle Atmosphere: System Description and First Results." The Singer radar embodies the classic Mills Cross structure of transmit and receive elements in both planes, therefore the system does not produce a cross-product of the transmit and receive apertures. The present invention, in contrast, discloses transmit apertures in one plane and receive apertures in an orthogonal plane, which produce a cross-product of the two orthogonal apertures.

A number of patents disclose orthogonal arrays for transmitting and receiving sonar waves. U.S. Pat. No. 4,121,190 to Edgerton et al. describes a method of sonar location having a narrow beam angle in a first plane and a wide beam angle in an orthogonal plane, to provide wide-angle echo-detection in the orthogonal plane with narrow-angle discrimination in the first plane. The Edgerton design simultaneously transmits and receives in both planes, therefore the product of those two beams does not produce the same image as processing the beams independently, as is disclosed by the present invention. U.S. Pat. No. 5,323,362 to Mitchell et al. discloses an ultrasound sonographic system having an orthogonal Mill's Cross scanner array in which high resolution scanning is performed by a synthetic orthogonal line array. A receiving transducer element (hydrophone) and a transmitting transducer element (projector) are moved from spot to spot along their respective orthogonal array lines. U.S. Pat. No. 6,084,827 to Johnson et al. discloses an apparatus and method for three dimensional tracking of underwater objects, having one multibeam sonar head in a first plane, a second multibeam sonar head in a second plane that intersects the first plane, for receiving sound waves, and a sound wave transmitter.

Orthogonal antennas are also known in the art. For example, U.S. Pat. No. 3,521,286 to Kuecken discloses at least three mutually orthogonally radiating elements which are substantially decoupled and may be independently tuned over wide operating frequency ranges. The intent of this invention is to use the orthogonally polarized elements to increase transmit and receive isolation, so that the transmit and receive elements can operate at the same frequency. The two horizontal elements and one vertical element are co-located (overlapping) and cross each other at a neutral point that keeps the elements from interfering with each other, unlike the present invention, which does not disclose co-located elements. As such, the Kuecken invention does not provide a cross-product to the orthogonal transmit and receive element, and thus does not disclose the functionality of the present invention.

Radars having separate transmit and receive apertures are known in the art. For example, frequency-modulation continuous-wave (FM/CW) radars typically comprise separate transmit and receive apertures in order to achieve high isolation between the transmitted signal and the receive signal reflected off the target. Typically, the transmit and receive apertures are the same size and point in the same direction in azimuth and elevation. In order to increase the resolution and range of the radar system, both apertures may be made larger. In the present invention, however, the transmit and receive apertures are orthogonal, and resolution and range may be increased by increasing aperture length in one dimension, and then taking the cross-product of the independent transmit and receive patterns.

Radar systems with linear antennas are well known in the art, dating back to the first wartime air defense system, the Chain Home radar system developed in Britain in the 1930s. The advent of parabolic reflectors enabled radars to transmit and receive a narrower, more focused beam and therefore use energy more efficiently. Further advances in antenna technology introduced phased array antennas into radar systems, wherein electronic steering eliminated moving parts that thus enabled faster scanning and made the devices much more reliable.

The present invention is directed to an innovative solution that achieves high resolution at lower cost, higher reliability, and/or smaller footprint than known designs: an antenna system wherein the apertures are substantially orthogonal to each other and separately perform the transmit and receive functions. The cross-product of the transmit and receive apertures of the present invention thus provides a narrow spot beam and a higher resolution image than that produced by conventional apertures that both transmit and receive.

As disclosed herein, the present invention may comprise at least two orthogonal antennas, wherein at least one is a transmit aperture and at least one is a receive aperture, and wherein the apertures may be of various shapes, including horn; pill box; planar; dielectric lens; dielectric rod; Cassegrain; or parabolic, elliptical or circular dish. By virtue of their orthogonal orientation, the cross-product of the two apertures is a higher resolution spot beam. The resulting antenna is beneficial because it may be smaller and lighter than conventional designs, and thus take up less surface area when installed. This then allows room for other sensors or antennas.

The antenna system of the present invention may alternatively comprise at least two orthogonal antennas, wherein each aperture rotates on a one-axis gimbal, and at least one is a transmit aperture and at least one is a receive aperture. The receive and transmit apertures scan in orthogonal planes.

The present invention may also comprise at least two orthogonal linear phased array antennas, wherein at least one is a transmit aperture and at least one is a receive aperture, and wherein the transmit and receive apertures scan in orthogonal planes. For example, the antenna system of the present invention may comprise a first 1D array that scans in a vertical (used herein interchangeably with "elevation") orientation and a second 1D array scans in a horizontal (used herein interchangeably with "azimuth") orientation. Various known methods of scanning may be employed by the present invention to scan the linear transmit aperture and the linear receive aperture, including mechanical scanning, electronic beam switching, electronically scanned phased array and digital beamforming.

It is well known that radars employing phased arrays benefit from a variety of system performance enhancements. Such benefits include beam agility; ability to form multiple beams; and packaging and form factors (conformal or low profile). The main cost drivers for phased arrays typically are the module cost and the cost of integration of the modules into the phased arrays. By using an innovative orthogonal linear array, the present invention offers comparable performance to conventional 2D filled arrays at a cost savings of from 5 times to 50 times or even more in larger arrays. In many radars, performance may be limited by the beamwidth (clutter) of the system and the necessity to generate and track multiple targets. At the same aperture size, the present invention provides comparable clutter reduction to that of a 2D filled array, by increasing the length of the 1D arrays by a factor of less than 1.5. A high resolution is achieved in the region overlapped by the two orthogonal fan beams generated by the two orthogonal apertures. In this innovative solution, two orthogonal beams with wide aspect ratios are combined to achieve a narrow spot beam product. By tapering the sidelobes and increasing the length of the arrays (by approximately 35%), as compared to the linear dimension of a 2D filled array, very similar clutter and 2-way sidelobe structure may be achieved.

As disclosed herein, each 1D array of the present invention may comprises a plurality of antenna elements disposed on any suitable array face, which may be a substrate, ground plane, boom, vehicle, rooftop, soil, or floating in water. The antenna elements, also termed herein phased array elements, may either transmit or receive or may comprise both transmit and receive modules, which then may be switched between transmit and receive functions. As disclosed herein, the antenna elements may be conventional elements that comprise a radiator, an amplifier, a switch, a phase shifter, and control electronics for various phase shift control functions. The antenna elements preferably are formed onto an array mounting fixture that has certain conductive and dielectric properties that define the bandwidth, frequency of operation, directivity, and polarization responses of the elements, depending on the desired application of the radar system. As disclosed herein, the array mounting fixture may be formed from metal, dielectric, string, an inflatable surface, cloth or other suitable material, or may be placed directly on the ground. Signals of each antenna element are combined through the combining network that comprises amplifiers and phase shifters.

As disclosed herein, the present invention combining network may be either analog or digital. A typical analog combining network may comprise coaxial cable in a space-fed combining network, wherein the signal is transmitted through air or other dielectric medium to the receive or transmit receptacle on the array element. As contemplated herein, forms of analog signal combining may include microstrip, strip line, twin lead, and wave guide. The present invention may also be directed to a digital beamforming combining network, wherein A/D converters are employed to send a digital signal to a computer or microprocessor and mathematically produce the various beam states of the array as part of the digital algorithm.

The present invention thus discloses a radar system wherein the transmit signal is reflected from a target or other object and is received by the orthogonal array, such that the 2-way transfer function results in the cross-product of two antenna patterns (one vertical and one horizontal). For the linear array embodiment, this cross-product is substantially the same as the product resulting from a fully populated 2D scan array. The output of the combining network is transmitted into a radar processing receiver, and ultimately may be displayed in various ways, such as a radar display, an audio alarm, or a warning light or other optical output. As embodied herein, the present invention may operate with a variety of radar waveforms, including frequency modulated continuous wave (FMCW), CW and pulse Doppler.

The following well-know radar formula describes the cross-product of the present invention:

$$P_{receive} = \frac{P_{transmit} G_{transmit} G_{receive} \sigma \lambda^2}{(4\pi)^3 R^4}$$

Where $P_{transmit}$ is the power of the transmit signal; $G_{transmit}$ is the gain of the transmit antenna; $G_{receive}$ is the gain of the receive aperture; σ is the radar cross-section (reflected signal from the target); λ is wavelength; and R is the radius to target.

Applications for the present invention include radar altimeters and obstacle avoidance; brown-out radars; missile guidance; missile defense radars (for example, when disposed on a tall ~300 meter structure); missile homing radars (for example, when formed as a circular conformal row of elements and another elongated linear array); ordnance/missile fuzing; weather radars (for example, when disposed on a long tower); wind profilers (for example, when disposed on two long orthogonal sticks); use with phase shifters; multiple beams (Butler matrix or Rotman lens); digital multibeam; space applications (for example, when flown on two long sticks in V or X shape); and search radar (for example, when disposed on two long sticks); fire control radars; airport traffic radar; vehicle collision avoidance; and light detection and ranging (LIDAR).

A preferred embodiment of the present invention may be employed as an affordable, high-resolution lightweight brownout landing aid for helicopters, overcoming limitation of prior art radars. As is well known, the acoustic, vibration and shock levels imposed on a helicopter from environmental and operational conditions are much more severe than those imposed on other air platforms. Using known technologies, a helicopter pilot's landing and takeoff aids have been dominated by optical frequency sensors at both the visible and IR frequencies. Known systems have degraded and/or limited range in adverse weather and brownout sand and dust storm conditions, however, that have limited the flight safety in desert and high precipitation environments. These limitations can also leave a helicopter open to other risks and vulnerabilities, including trap wires strung between buildings and trees when common ingress and egress paths of a helicopter are known. Urban/suburban landing and takeoffs can also become dangerous if nearby mobile land vehicles are in close proximity to a makeshift helicopter landing site. For example, where these mobile land vehicles have limited visibility to approaching aircraft in a tactical brownout environment, the vehicles may not be able to move out of the way of the landing helicopter, and it may be difficult for the incoming helicopter to detect the mobile vehicles. Other ground-based human activities in urban operations can also interfere with a helicopter's safe landing. Microwave and millimeter wave (MMW) imaging systems offer the advantages of a lower frequency range that can see farther in range, and such systems are less affected by severe atmospheric changes. A radar system also offers full day/night capability without performance degradation, and in particular, a MMW radar system offers the resolution required to determine safe landing and takeoff conditions, as well as a package size that can be incorporated within the weight and size constraints of military and commercial helicopter platforms. For cost and technology maturity reasons, mechanically scanned MMW antenna systems are often considered for helicopter landing applications, but such systems must be designed to operate with high reliability and extremely fast scanning rates in order to meet the landing and full 360° coverage requirements in azimuth over the full range of dynamic conditions of the helicopter. The logistics, maintenance, and support of the mechanically scanned antenna systems often become the most important cost driver and the limiting factor of the system. An electronically scanned phased array is the ideal choice for the above requirements for rapid scanning, lower profile, and reliability. The limitation then becomes the cost of the MMW phased array.

Any MMW radar system must also compete for the same real estate on the undercarriage and sides of the aircraft as the other RF systems, including UHF Line of Sight (LOS), data links, altimeters, navigation, IFF, and other communications systems antennas. The end result produces a considerable real estate competition/shortage and/or platform antenna(s) integration issue. These issues may include interference and blockage from multiple single function RF apertures that often will degrade the radars stand-alone and modeled performance. Thus, in addition to weight and cost considerations, a major challenge is the need to find the optimum way to integrate the radar antenna's functionality onto the helicopter platform while allowing for multiple simultaneous RF functions to exist, all without degradation to either the radar's stand-alone performance or that of the other RF systems.

As described herein with reference to FIGS. 10, 11, 12 and 13, the MMW radar system 5 of the present invention provides an innovative RF multi-function capability that enables the integration of new sensor technology onto the helicopter while maintaining existing system effectiveness. As embodied herein, the present invention provides an antenna system architecture that can incorporate multiple functions (like those described above) into a single antenna system that will result in lower cost, weight, and reduced number of apertures on an aircraft. The solution must be small, lightweight, low physical volume, visually concealed, and have a low radar cross section (RCS), while simultaneously performing each antenna function without degradation to the primary antenna(s) function. This is accomplished by the innovative technology of the present invention, based on the volumetric reuse of the area that would have been occupied by a 2D filled aperture. The present invention provides fast scanning as well as fine resolution, achieved from the product of two transmit and receive beams.

In order to achieve desirable cost, weight and performance objectives of a MMW Radar antenna system, the present invention contemplates two orthogonal electronically scanned/multiple beam antennas with an approximately 5° beamwidths in one plane and fan beam in the orthogonal dimension. This allows for rapid scanning in both azimuth and elevation, and the ability to determine the radar return at multiple ranges on 5°×5° pixel by pixel basis. This is achieved by generating the cross product of the elevation and azimuth scan positions of the two orthogonal arrays. As embodied herein, radar system 3 uses a low power MMW frequency. It is also possible with this design to generate simultaneous receive beams to reduce update times, thus minimizing transmit power requirements for the radar system. Analysis of the waveform shows that a single channel radar with a total effective isotropic radiated power of 100 mW at MMW waves is sufficient to detect objects with 3 $m^2$ Radar Cross Section (RCS) at an operating altitude of 150 meters. The angular resolution preferably is set at 5°. Narrower beamwidth and higher angular resolution can be achieved with linear (as opposed to square) dependency on the number of elements and the length of the arrays, as described further below. As such, Applicant believes that the innovative design of the present invention overcomes the cost barrier of a 2D scanned array in this application for helicopters.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

SUMMARY OF THE INVENTION

In response to the foregoing challenge, Applicant has developed an innovative radar system having an orthogonal transmit/receive antenna system. As illustrated in the accompanying drawings and disclosed in the accompanying claims, the invention comprises a radar system having an orthogonal antenna system, wherein the orthogonal antenna system further comprises at least one transmit aperture producing a transmit beam and at least one receive aperture producing a receive beam, wherein the at least one transmit aperture is substantially orthogonal to the at least one receive aperture, and wherein the transmit beam is narrow in a first dimension and wide in a second dimension, and the receive beam is wide orthogonally to the first dimension and narrow orthogonally to the second dimension, and wherein a composite narrow beam cross-product results from an intersection of the transmit beam with the receive beam.

The at least one transmit aperture and the at least one receive aperture may be provided in a horn, pill box, planar, dielectric lens, dielectric rod, Cassegrain, parabolic, elliptical, circular dish or linear shape. The orthogonal antenna system may also comprise at least one transmit aperture that rotates on a first one-axis gimbal and at least one receive aperture that rotates on a second one-axis gimbal in a plane orthogonal to the at least one transmit aperture. In addition, the orthogonal antenna system may comprise at least one transmit aperture that further comprises at least one linear phased array, and at least one receive aperture that further comprises at least one linear phased array.

The at least one linear phased array transmit aperture and the at least one linear phased array receive aperture may each further comprise a plurality of antenna elements disposed on an array face and connected by a combining network, and wherein each of the antenna elements further comprises a radiator and a phase shifter.

The orthogonal antenna system, having a linear length of between 1.0 and 1.5 times that of a fully populated square 2D scan array, may generate a composite narrow beam cross-product that is substantially the same resolution as the fully populated square 2D scan array. Further, the at least one linear phased array transmit aperture and the at least one linear phased array receive aperture may be scanned via mechanical scanning, electronic beam switching, electronically scanned phased array or digital beamforming.

In the radar system of the present invention, the orthogonal antenna system may provide high resolution imaging at a microwave frequency or at millimeter wave frequency.

In an alternate embodiment, the at least one transmit aperture may be switched to operate in a receive mode and the at least one receive aperture is simultaneously switched to operate in a transmit mode. In this alternate embodiment, the at least one transmit aperture and the at least one receive aperture may be provided in a horn, pill box, planar, dielectric lens, dielectric rod, Cassegrain, parabolic, elliptical, circular dish or linear shape. The orthogonal antenna system may comprise at least one transmit aperture that rotates on a first one-axis gimbal and at least one receive aperture that rotates on a second one-axis gimbal in a plane orthogonal to the at least one transmit aperture. The alternate embodiment orthogonal antenna system may also comprise at least one transmit aperture that further comprises at least one linear phased array, and at least one receive aperture that further comprises at least one linear phased array. The at least one linear phased array transmit aperture and the at least one linear phased array receive aperture each may further comprise a plurality of antenna elements disposed on an array face and connected by a combining network, wherein each of the antenna elements further comprises a radiator and a phase shifter. The orthogonal antenna system, having a linear length of between 1.0 and 1.5 times that of a fully populated square 2D scan array, may generate a composite narrow beam cross-product that is substantially the same resolution as the fully populated square 2D scan array. The at least one linear phased array transmit aperture and the at least one linear phased array receive aperture may be scanned via mechanical scanning, electronic beam switching, electronically scanned phased array or digital beamforming. The alternate embodiment orthogonal antenna system may provide high resolution imaging at a microwave frequency and at a millimeter wave frequency.

BRIEF DESCRIPTION OF THE DRAWINGS

FIG. 17 depicts a series of graphs of the beam footprint, projected onto the ground, that is produced by a single linear phased array aperture oriented to vertical at 150 meters above ground, according to a second alternate embodiment of the present invention.

FIG. 18 depicts a series of graphs of the beam footprint, projected onto the ground, that is produced by a single linear phased array aperture oriented to horizontal at 150 meters above ground, according to a second alternate embodiment of the present invention.

FIGS. 19-28 depict a series of graphs of the beam footprint, in units of received power at target, that is produced by the cross-product of the 1×24 element vertical and 1×24 element horizontal apertures of an orthogonal linear transmit receive phased array antenna at 150 meters above ground, according to a second alternate embodiment of the present invention, compared with the beam footprint of a 16×16 element 2D array.

DETAILED DESCRIPTION OF THE INVENTION

Figure 1:
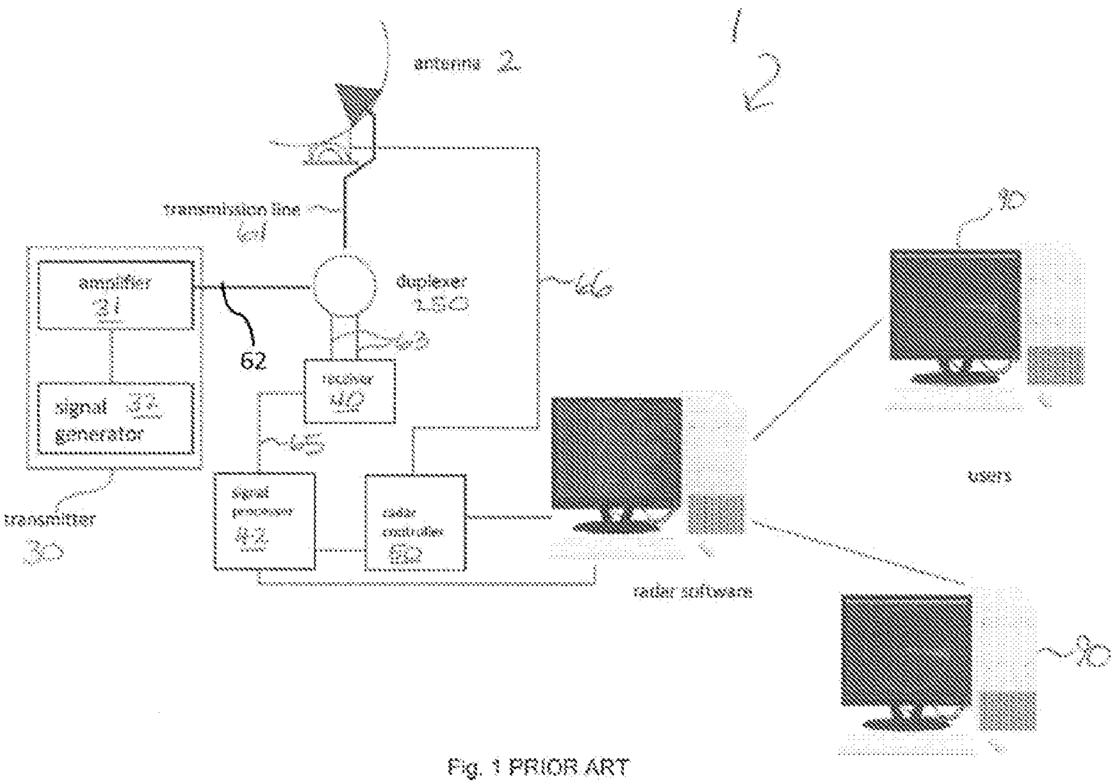
Fig. 1 PRIOR ART
FIG. 1 is a schematic representation of a generalized prior art radar system having a conventional antenna system.

Referring now to FIG. 1, a schematic representation of a typical prior art radar system 1 is shown. Radar system 1 comprises antenna 2 for transmitting and receiving RF signals. Antenna 2 is connected by transmit/receive transmission line 61 to duplexer 250. Duplexer 250 is in turn connected to transmitter 30, via transmit transmission line 62. Transmitter 30 further comprises signal generator 32 and amplifier 31. Signal generator 32 produces a transmitted signal, which is amplified by amplifier 31 and then is fed to antenna 2. Duplexer 250 is also connected to receiver 40 via receive transmission line 63. Receiver 40 is in turn connected to signal processor 42, which is connected to radar controller 50. Antenna 2 receives a received signal reflected from a given object or target, and then the received signal is fed to duplexer 250 via transmission line 61, to receiver 40 via receive transmission line 63 and to radar controller 50 via controller transmission line 66. Finally, received signal data are processed by radar software and displayed on a graphical user interface for users 90.

With continuing reference to FIG. 1, a typical prior art radar antenna comprises both transmit and receive functionality in a single aperture, as shown by antenna 2.

Figure 2:
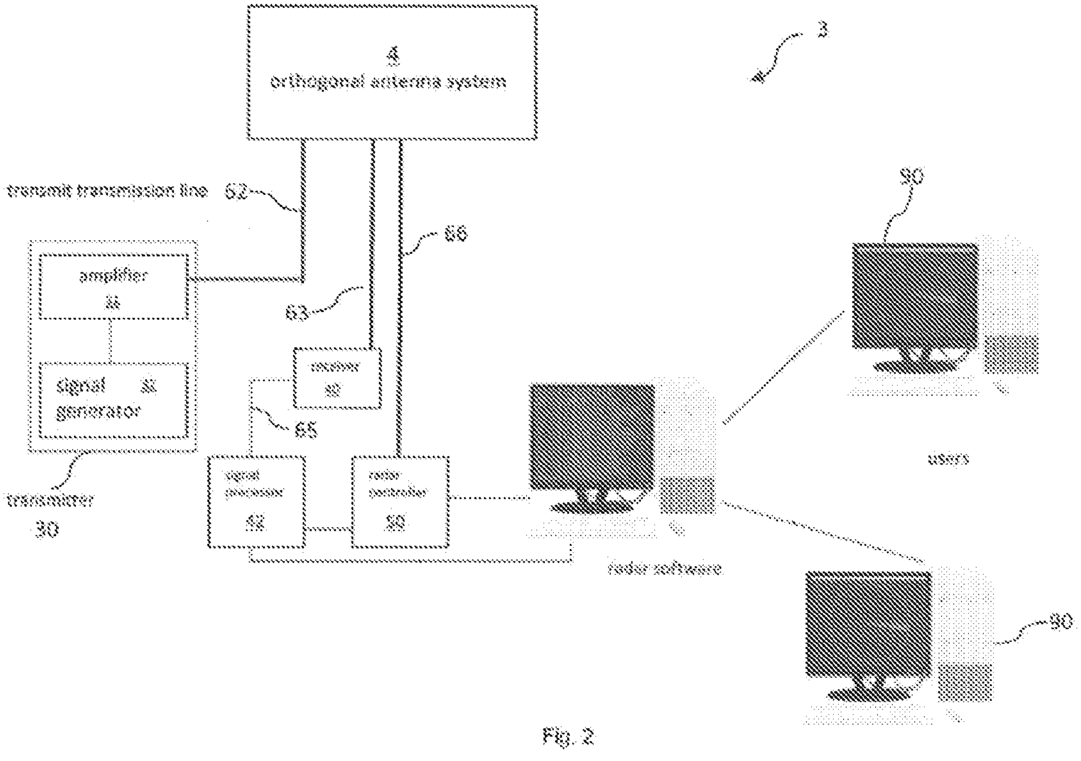
FIG. 2 is a schematic representation of a radar system having an orthogonal antenna system according to a first embodiment the present invention.

Referring now to FIG. 2, a schematic representation of radar system 3 is shown. Radar system 3, according to a generalized embodiment of the present invention, preferably comprises orthogonal antenna system 4 for transmitting and receiving RF signals. Similarly to the prior art system of FIG. 1, orthogonal antenna system 4 preferably is connected to transmitter 30, receiver 40, signal processor 42 and radar controller 50. Transmitter 30 further comprises signal generator 32 and amplifier 31. Signal generator 32 produces a transmit signal, which is amplified by amplifier 31 and then is fed to orthogonal antenna system 4. However, the separate orthogonal transmit and receive apertures of the present invention result in a novel configuration for radar system 3. As embodied herein, radar system 3 may not include duplexer 250; because the transmit and receive functions are handled by different apertures, there is no need to switch between transmit/receive modes on a single aperture. Further, transmitter 30 is connected via transmit transmission line 62 directly to the transmit aperture (as shown below in FIG. 8) of orthogonal antenna system 4, and receiver 30 is connected via receive transmission line 63 directly to the receive aperture (as shown below in FIG. 8) of orthogonal antenna system 4. With continuing reference to FIG. 2, orthogonal antenna system 4 receives a received signal reflected from a given object or target, and then the received signal is fed to receiver 40 via receive transmission line 63 and to radar controller 50 via controller transmission line 66. Finally, the received signal data are processed by radar software and displayed on a graphical user interface for users 90.

Figure 3:
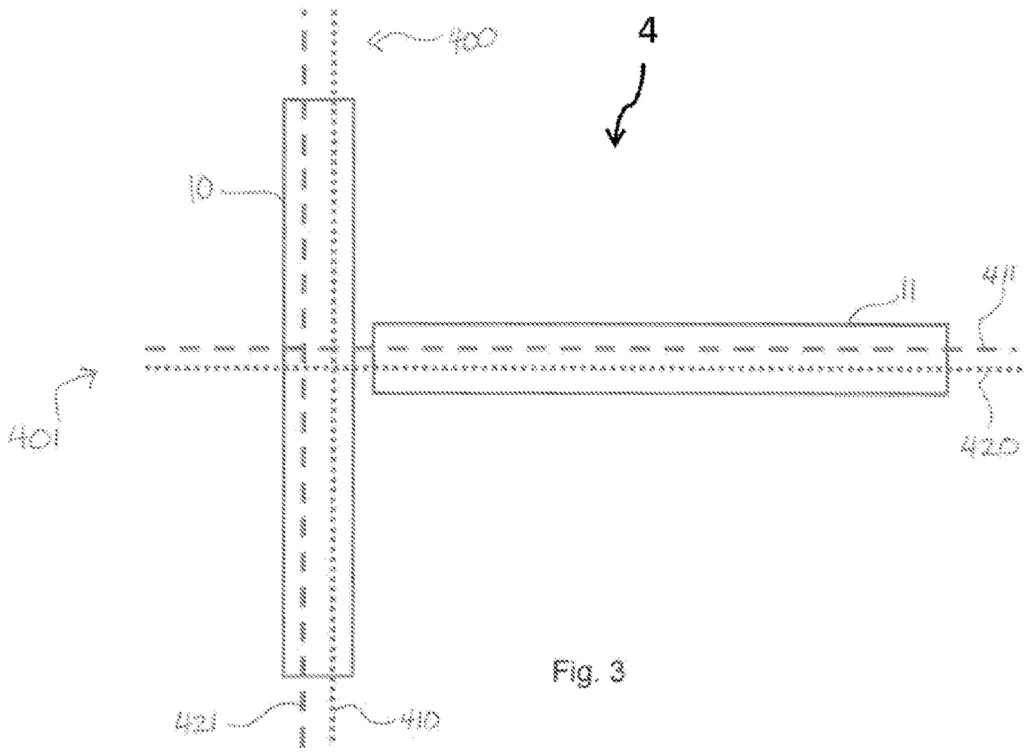
FIG. 3 is a front view of an orthogonal antenna system having a transmit aperture and an orthogonally-oriented receive aperture according to the present invention, showing the fan beam and narrow beam produced by the transmit aperture and the orthogonal fan beam and narrow beam produced by the receive aperture.

Referring now to FIG. 3, the beams produced by orthogonal antenna system 4 are shown. As embodied herein, orthogonal antenna system 4 preferably comprises at least one transmit aperture and at least one orthogonally-oriented receive aperture. Orthogonal antenna system 4 preferably comprises a first aperture 10 and a second aperture 11. As shown in FIG. 3, first aperture 10 is oriented in a vertical position and is the transmit aperture, and second aperture 11 is oriented in a horizontal position and is the receive aperture, but it is contemplated by the present invention that the antenna positions may be switched without change in functionality of orthogonal antenna system 4 (i.e., vertical aperture 10 may be the receive aperture and horizontal aperture 11 may be the transmit aperture). As shown in FIG. 3, vertical first aperture 10 produces first aperture narrow beam 410 in first dimensional plane (elevation) 400 and first aperture fan beam 411 in the orthogonal plane, second dimensional plane (azimuth) 401. Horizontal second aperture 11 produces second aperture fan beam 421 in first dimensional plane (elevation) 400 and second aperture narrow beam 420 in the orthogonal plane, second dimensional plane (azimuth) 401.

As contemplated by the present invention, orthogonal antenna system 4 may comprise at least two antennas having orthogonal transmit and receive apertures of various shapes, including horn; pill box; planar; dielectric lens; dielectric rod; Cassegrain; or parabolic, elliptical or circular dish. First aperture 10 and second aperture 11 may be formed from metal plates, low-loss microwave substrates, copper or aluminum waveguides, or similar low-loss materials.

Figure 4:
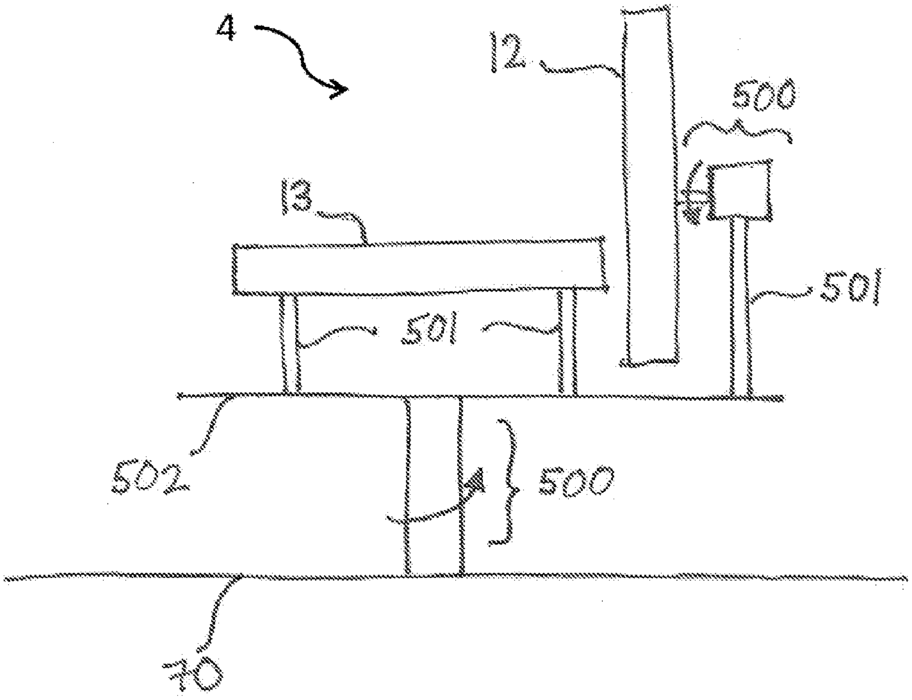
FIG. 4 is a front view of an orthogonal antenna system having two antennas, each with a one-axis gimbal, wherein one aperture is a transmit aperture and the other aperture is an orthogonally-oriented receive aperture, according an alternate embodiment of the present invention.

Referring now to FIG. 4, orthogonal antenna system 4 is shown in an alternate embodiment comprising first gimbaled aperture 12 and second gimbaled aperture 13, oriented in an orthogonal position to first gimbaled aperture 12. First gimbaled aperture 12 preferably is on a one-axis gimbal comprising gimbal and motor assembly 500 and support element 501. Similarly, second gimbaled aperture 13 preferably is on a one-axis gimbal attached to two supports element 501 on turntable 502, which is disposed on gimbal and motor assembly 500. As shown in FIG. 4, first gimbaled aperture 12 is oriented in a vertical position and second gimbaled aperture 13 is oriented in a horizontal position on substrate 70, but it is contemplated by the present invention that the antenna positions may be switched without change in functionality of orthogonal antenna system 4. As embodied herein, one gimbaled aperture preferably is a transmit aperture and the other gimbaled aperture preferably is a receive aperture, wherein the cross-product of the orthogonal apertures 12 and 13 is a high resolution spot beam as described further herein. First gimbaled aperture 12 and second gimbaled aperture 13 may be formed from metal plates, low-loss microwave substrates, copper or aluminum waveguides, or similar low-loss materials, in conjunction with stepper or direct drive motors, rotary joints and stability mounts.

Figure 5A:
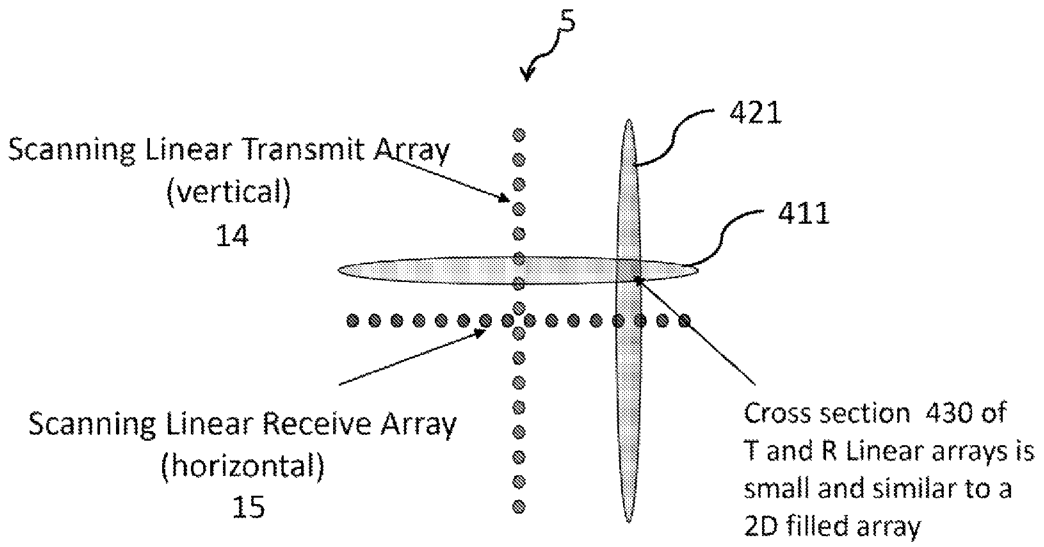
FIG. 5*a* is a front view of an orthogonal antenna system having two linear phased array antennas, wherein one aperture is a transmit aperture and the other aperture is an orthogonally-oriented receive aperture, showing the intersecting fan beams, according a second alternate embodiment of the present invention.
Figure 5B:
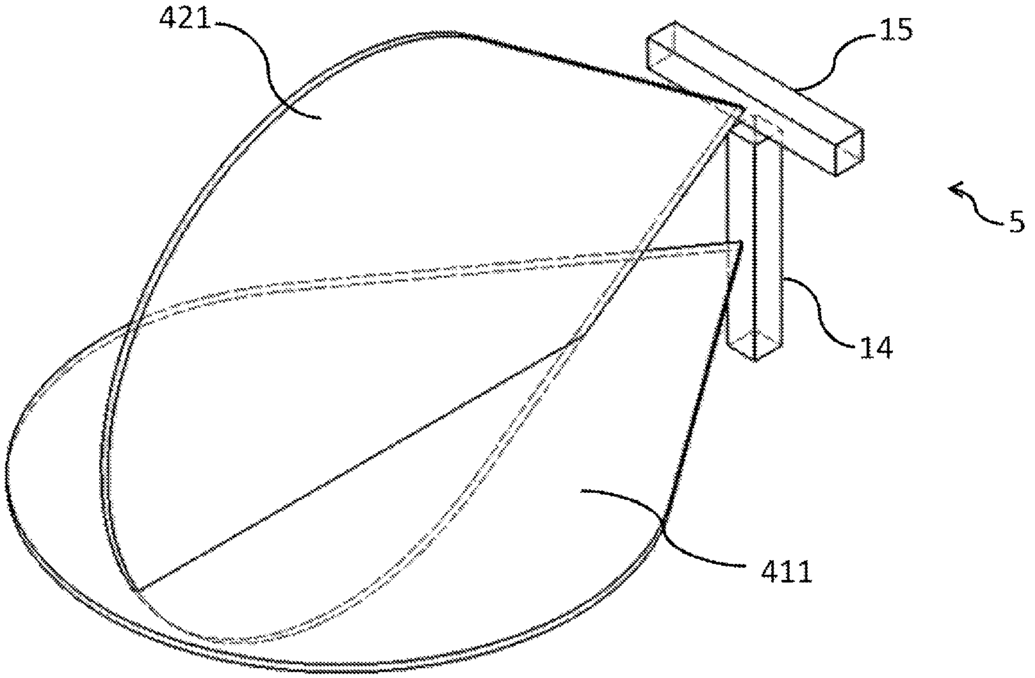
FIG. 5*b* is a perspective view of an orthogonal antenna system having two linear phased array antennas, wherein one aperture is a transmit aperture and the other aperture is an orthogonally-oriented receive aperture, showing the intersecting fan beams, according a second alternate embodiment of the present invention.

Referring now to FIGS. 5*a* and 5*b*, a second alternate embodiment of the present invention is shown as orthogonal phased array antenna system 5, which preferably comprises first linear 1D array 14 and second linear 1D array 15, oriented in an orthogonal position to array 14. As embodied herein, one array preferably is a transmit aperture and the other array is an orthogonally-oriented receive aperture. As shown in FIGS. 5*a* and 5*b*, first linear 1D array 14, is a transmit aperture, producing first aperture fan beam 411, and second linear 1D array 15, is a receive aperture, producing second aperture fan beam 421, wherein the cross-product of the orthogonal arrays 14 and 15 is a high resolution spot beam 430 as described further herein. As shown in FIGS. 5*a* and 5*b*, first linear 1D array 14 is oriented in a vertical position and second linear 1D array 15 is oriented in a horizontal position, but it is contemplated by the present invention that the antenna positions may be switched without change in functionality of orthogonal phased array antenna system 5. Furthermore, It is also possible with the design of the present invention to generate simultaneous receive beams in order to reduce update times, thus minimizing transmit power requirements.

Figure 6:
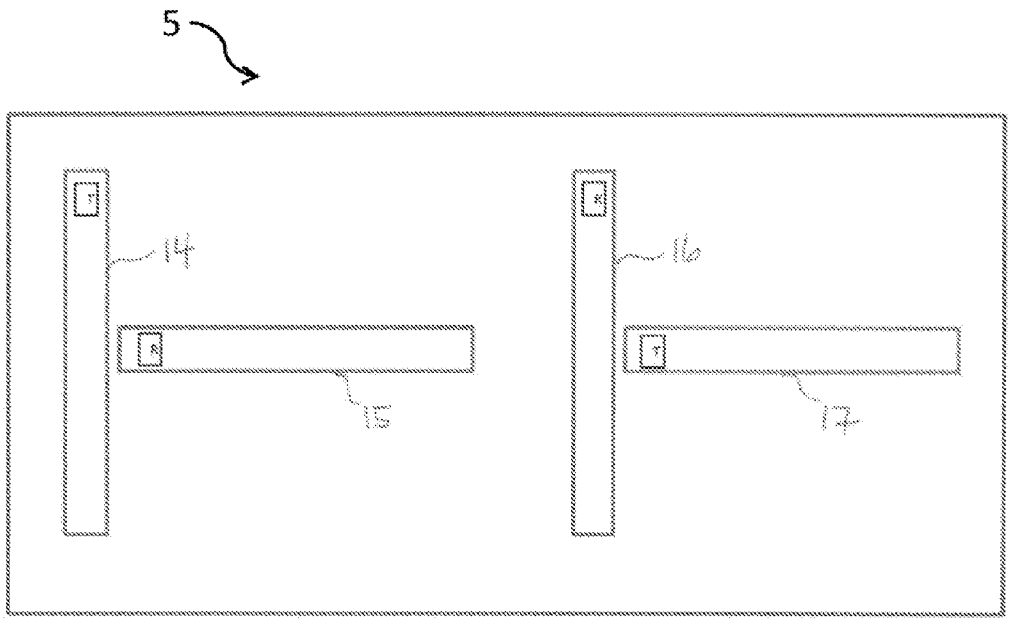
FIG. 6 is a front view of an orthogonal antenna system having a pair of antennas, each comprising two linear phased array antennas, wherein one aperture of each pair is a transmit aperture and the other aperture of each pair is an orthogonally-oriented receive aperture, according a third alternate embodiment of the present invention.

Referring now to FIG. 6, a third alternate embodiment of the present invention is shown as orthogonal phased array antenna system 5, which preferably comprises at least two pairs of antennas, the first pair comprising first linear 1D array 14 and second linear 1D array 15, oriented in an orthogonal position to array 14, and the second pair comprising third linear 1D array 16 and fourth linear 1D array 17, oriented in an orthogonal position to array 16. As shown in FIG. 6, one aperture of each pair preferably is a transmit aperture and the other aperture of each pair preferably is an orthogonally-oriented receive aperture, such that first linear 1D array 14 is a transmit aperture and second linear 1D array 15 is a receive aperture, and third linear 1D array 16 is a receive aperture and fourth linear 1D array 17 is a transmit aperture. It is contemplated by the present invention that the antenna positions may be switched, for example such that that first linear 1D array 14 is a receive aperture and second linear 1D array 15 is a transmit aperture, and third linear 1D array 16 is a transmit aperture and fourth linear 1D array 17 is a receive aperture, or, such that first linear 1D array 14 is a receive aperture and second linear 1D array 15 is a transmit aperture, and third linear 1D array 16 is a receive aperture and fourth linear 1D array 17 is a transmit aperture, without change in functionality of orthogonal phased array antenna system 5. Further, the present invention may comprise more than two pairs of antennas. By employing more than one pair of orthogonally-oriented phased array antennas, the present invention can further narrow the resolution relative to the original pair of orthogonally-oriented phased array antennas. This provides mounting flexibility, as well as manufacturing and logistics benefits over enlarging either or both of the apertures of the original pair.

Figure 7:
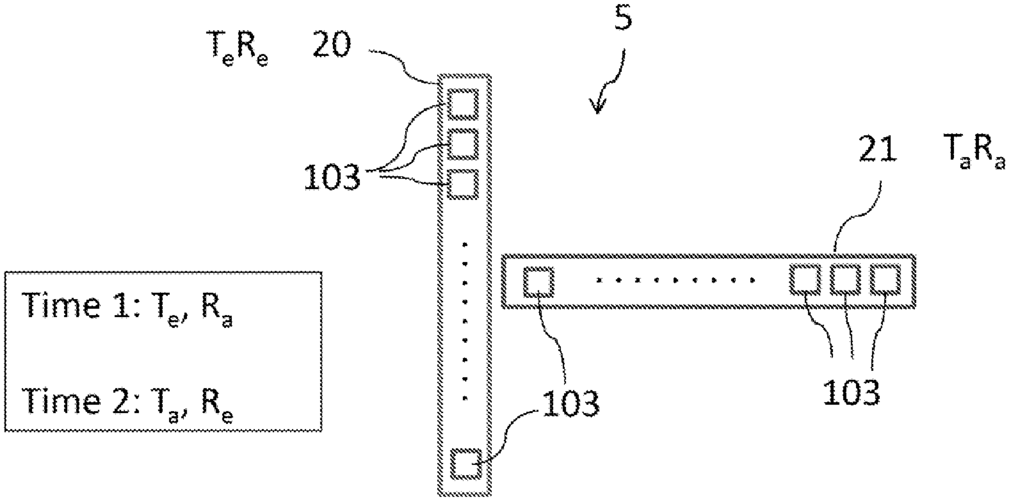
FIG. 7 is a front view of an orthogonal antenna system having two linear, orthogonally-oriented phased array antennas, wherein both apertures have transmit/receive functionality, such that at time $T_1$ the first aperture transmits while the second aperture receives, and at time $T_2$ the second aperture transmits while the first aperture receives, according a fourth alternate embodiment of the present invention.

Referring now to FIG. 7, a fourth alternate embodiment of the present invention is shown as orthogonal phased array antenna system 5, which preferably comprises two linear, orthogonally-oriented phased array antennas, wherein both apertures have transmit/receive functionality. As embodied herein, first linear 1D array 20 comprises a plurality of transmit/receive elements 103, and second linear 1D array 21 also comprises a plurality of transmit/receive elements 103. At any given time, each array functions as either a transmit or receive array, with the orthogonal array operating in the other mode. Then by switching the antenna element 103, each antenna may be changed to the other mode. As embodied herein, $T_e$ indicates transmit mode (in elevation), $R_e$ indicates receive mode (in elevation), $T_a$ indicates transmit mode (in azimuth) and $R_a$ indicates receive mode (in azimuth). For example, as shown in FIG. 7, at time $T_1$, first linear 1D array 20 transmits in elevation, while second linear 1D array 21 receives in azimuth, and at time $T_2$, second linear 1D array 21 transmits in azimuth while the first linear 1D array 20 receives in elevation. Thus, the cross-product of orthogonal arrays 20 and 21 is a high resolution spot beam as described further herein.

Figure 8A:
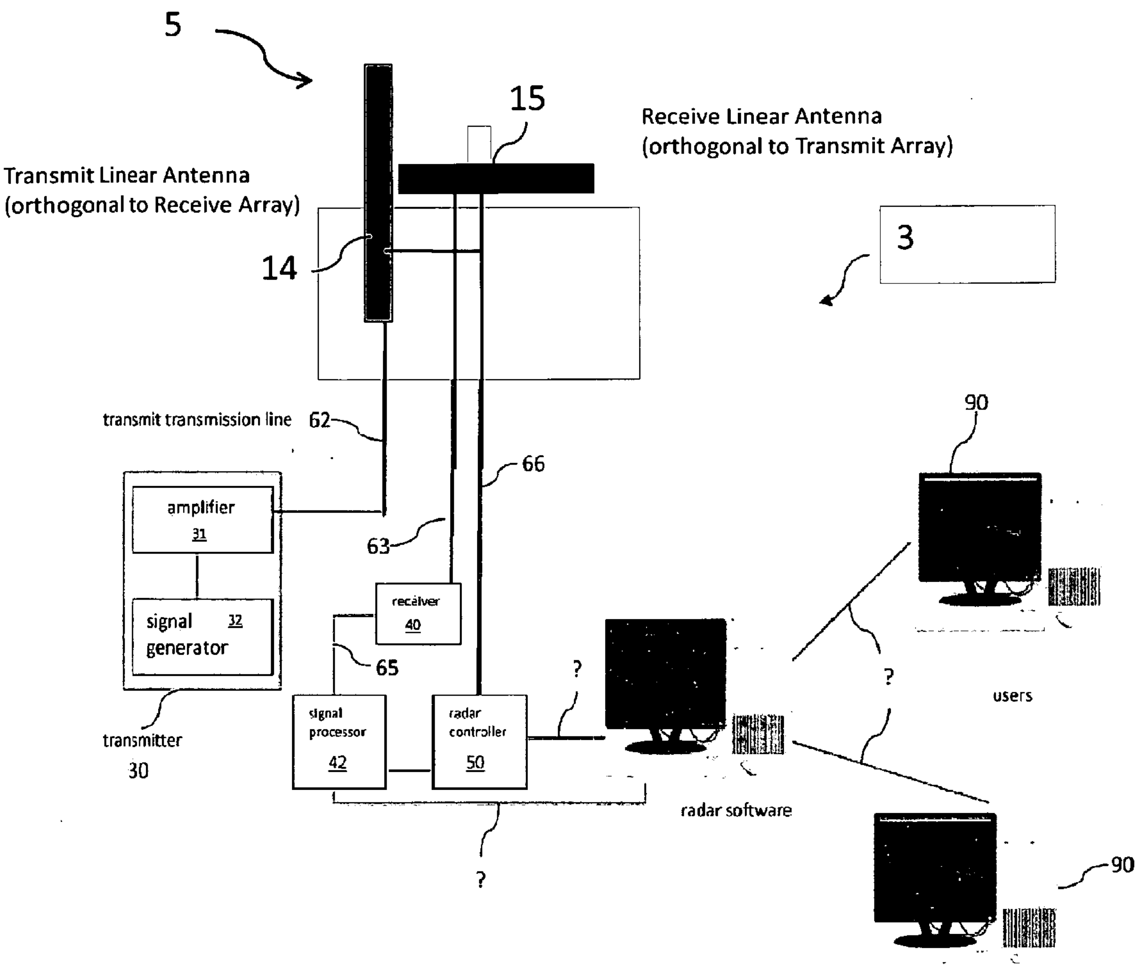
FIG. 8*a* is a schematic representation of a radar system having an orthogonal antenna system, comprising at least one linear phased array antenna that is a transmit aperture and at least one orthogonally-oriented linear phased array antenna that is a receive aperture, according a second alternate embodiment of the present invention.

Referring now to FIG. 8*a*, orthogonal phased array antenna system 5 of the present invention is shown as part or radar system 3. Radar system 3, according to a preferred embodiment of the present invention, comprises orthogonal antenna system 5 for transmitting and receiving RF signals. As described in connection with FIG. 2, orthogonal antenna system 5 preferably is connected to transmitter 30, receiver 40, signal processor 42 and radar controller 50. Transmitter 30 further comprises signal generator 32 and amplifier 31. Signal generator 32 produces a transmit signal, which is amplified by amplifier 31 and then is fed to orthogonal phased array antenna system 5. Transmitter 30 is connected via transmit transmission line 62 directly to the transmit aperture (as shown, first linear 1D array 14) of orthogonal phased array antenna system 5, and receiver 30 is connected via receive transmission line 63 directly to the receive aperture (as shown, second linear 1D array 15) of orthogonal phased array antenna system 5. With continuing reference to FIG. 8, orthogonal phased array antenna system 5 receives a received signal reflected from a given object or target, and then the received signal is fed to receiver 40 via receive transmission line 63 and to radar controller 50 via controller transmission line 66. Finally, the received signal data are processed by radar software and displayed on a graphical user interface for users 90.

Figure 8B:
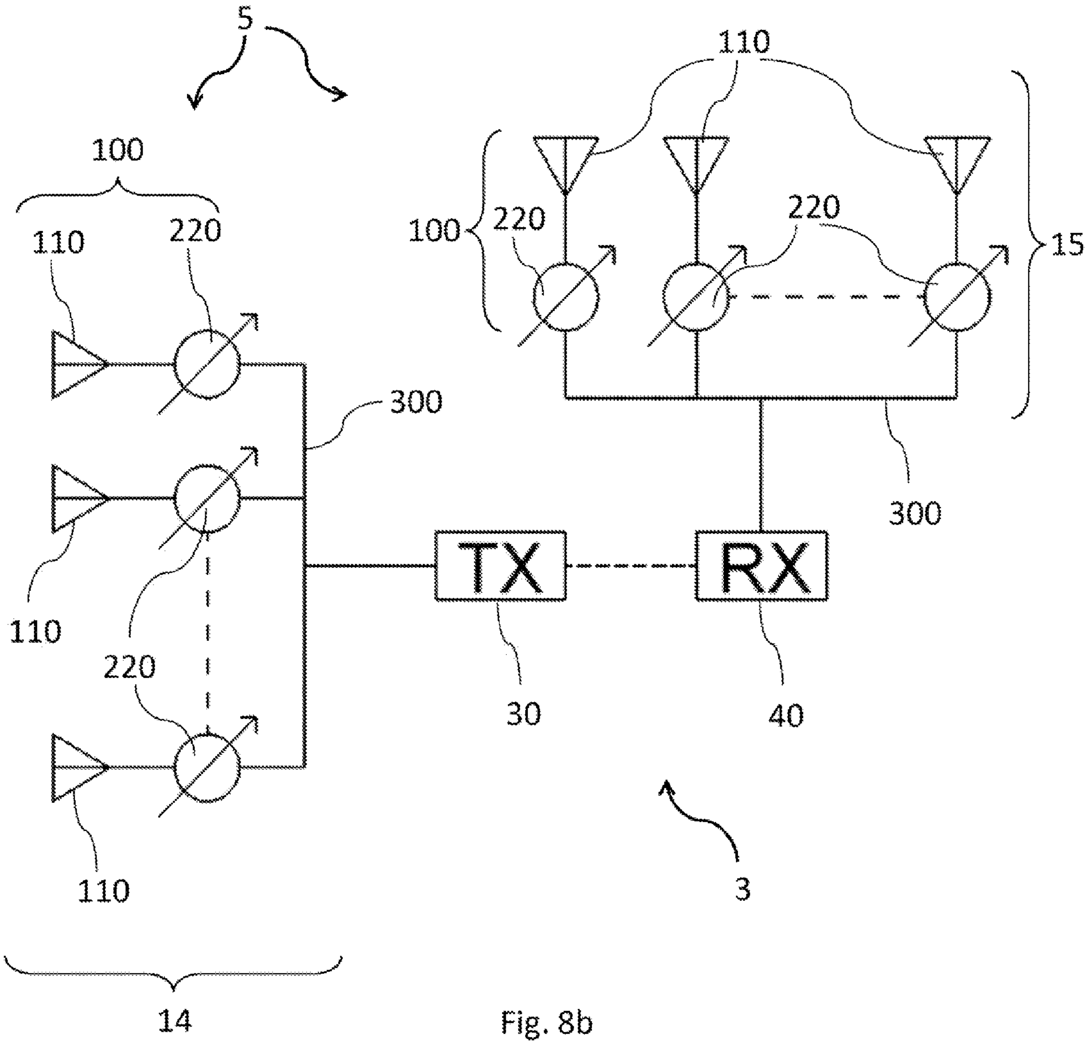
FIG. 8*b* is a schematic representation of a radar system having an orthogonal antenna system, comprising at least one linear phased array antenna that is a transmit aperture and at least one orthogonally-oriented linear phased array antenna that is a receive aperture, according a second alternate embodiment of the present invention.

Referring now to FIG. 8*b*, orthogonal phased array antenna system 5 of the present invention is shown as part of radar system 3 in a schematic diagram. Radar system 3, according to a preferred embodiment of the present invention, comprises orthogonal antenna system 5 for transmitting and receiving RF signals. As described in connection with FIG. 2, orthogonal antenna system 5 preferably is connected to transmitter 30 and receiver 40. Orthogonal antenna system 5 preferably further comprises a transmit aperture (first linear 1D array 14) connected to transmitter 30 and a receive aperture (second linear 1D array 15) connected to receiver 40. Transmit aperture 14 preferably further comprises a plurality of antenna elements 100, connected to transmitter 30 via combining network 300. Similarly, receive aperture 15 preferably further comprises a plurality of antenna elements 100, connected to receiver 40 via combining network 300. Each antenna element 100 preferably comprises a radiator 110 and a phase shifter 220.

Figure 9A:
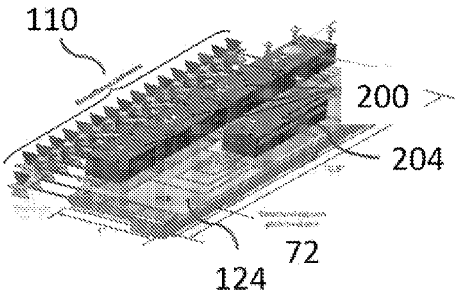
FIG. 9*a* is a perspective view of a 1D linear phased array antenna, representing either a transmit aperture or a receive aperture, showing 16 radiators, 5 modules, printed circuit board and array face (substrate), according a second alternate embodiment of the present invention.

Referring now to FIG. 9*a*, the components of a 1D linear phased array antenna are shown in a preferred embodiment. As embodied herein, FIG. 9*a* may represent either a transmit aperture or a receive aperture (first linear 1D array 14 or second linear 1D array 15), which is shown comprising sixteen radiators 110 which are attached to array face 72, four modules 200 and a driver module 204 which are disposed on array face 72, and printed circuit board 124 which is disposed on array face 72. Radiator 110 may be a dipole, microstrip patch, slot antenna, notch, Vivaldi notch or similar radiator structures formed from appropriate metals such as copper, gold, aluminum, silver or the like; dielectric materials, including air, foam, Teflon, plastic, PTFE, chopped fibers, fiberglass; or other low-loss, dielectric materials. Module 200 may be a transmit module 201 (not shown) or a receive module 202 (not shown) and further comprise commonly available amplifier and phase shifter components. In this embodiment, each module 200 preferably feeds four radiators 110, and driver module 204 amplifies an RF signal to the proper level for input into the four modules 200. Printed circuit board 124 may be formed by standard industry photolithography and etching methods.

Figure 9B:
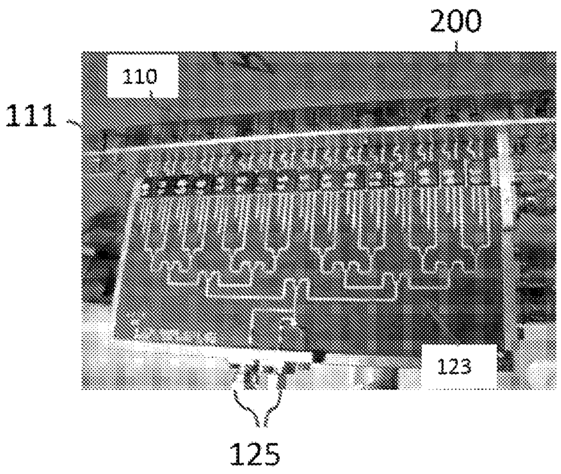
FIG. 9*b* is a perspective view of a 1D linear phased array antenna, representing either a transmit aperture or a receive aperture, showing 16 radiators, 16 modules, transmission line, connectors and array mounting fixture, according a second alternate embodiment of the present invention.

Referring now to FIG. 9*b*, the components of a 1D linear phased array antenna are shown in a variation of a preferred embodiment. As embodied herein, FIG. 9*b* may represent either a transmit aperture or a receive aperture (first linear 1D array 14 or second linear 1D array 15), which is shown comprising sixteen radiators 110 which are attached to ground plane 111, and sixteen modules 200 which are disposed on printed circuit board 124. As embodied herein, each module 200 preferably feeds a single radiator 110. The 1D linear phased array antenna of the present invention further comprises transmission lines 123, which feed modules 200 and are connected to feed system 60 (not shown) via connectors 125.

Figure 10A:
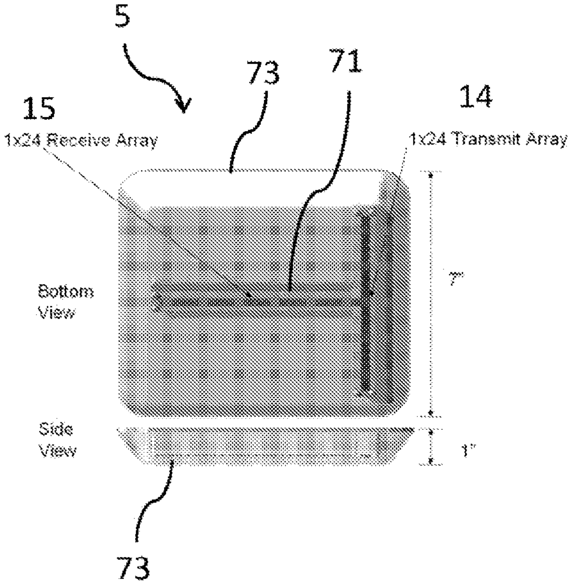
FIG. 10*a* is a bottom view and a side view of an orthogonal antenna system having a linear receive phased array aperture and an orthogonally-oriented linear transmit phased array aperture encased in a radome (transparent in this view), according a second alternate embodiment of the present invention.

Referring now to FIG. 10*a*, orthogonal phased array antenna system 5 of the present invention is shown in a bottom view and a side view. First linear 1D array 14 is shown disposed on array mounting fixture 71, with second linear 1D array 15 disposed in an orthogonal orientation on array mounting fixture 71. In an exemplary embodiment as shown, first linear 1D array 14 is a 1×24 element transmit array, and second linear 1D array 15 is a 1×24 element receive array. Orthogonal arrays 14 and 15 are encased in radome 73. Radome 73 may be formed from appropriate low-loss dielectric materials, as is well-known in the art.

Figure 10B:
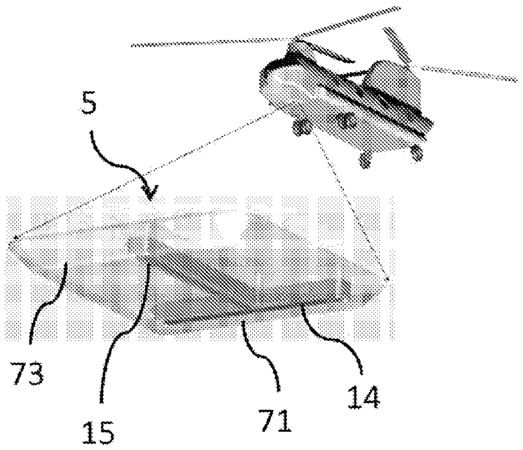
FIG. 10*b* is a perspective view of an orthogonal antenna system having a linear receive phased array aperture and an orthogonally-oriented linear transmit phased array aperture, showing the placement of the antenna system on a helicopter, according a second alternate embodiment of the present invention.

Referring now to FIG. 10*b*, orthogonal phased array antenna system 5 of the present invention is shown in an exemplary placement on the front underside of a helicopter. First linear 1D array 14 preferably is disposed on array mounting fixture 71, with second linear 1D array 15 disposed in an orthogonal orientation on array mounting fixture 71. Orthogonal arrays 14 and 15 are encased in radome 73. As embodied herein, orthogonal phased array antenna system 5 is a component of radar system 3 of the present invention.

Figure 11A:
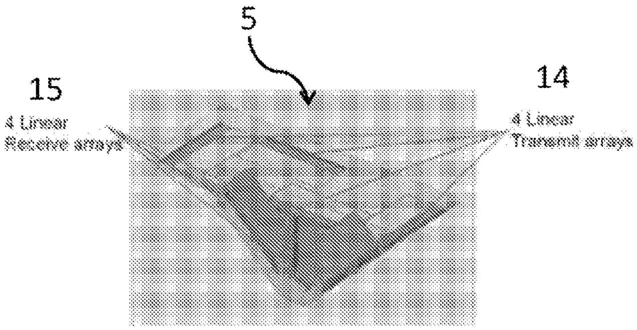
FIG. 11*a* is a perspective view of an orthogonal antenna system having 4 pairs of antennas, each comprising two linear phased array antennas, wherein one aperture of each pair is a transmit aperture and the other aperture is an orthogonally-oriented receive aperture, according a fifth alternate embodiment of the present invention.

Referring now to FIG. 11*a*, orthogonal phased array antenna system 5 of the present invention is shown in an alternate embodiment comprising four pairs of antennas, each further comprising two linear phased array antennas, wherein one aperture of each pair is a transmit aperture (first linear 1D array 14) and the other aperture is an orthogonally-oriented receive aperture (second linear 1D array 15). In order to achieve 360° coverage for avoidance of power lines, other helicopters, or other objects, additional apertures are required.

Figure 11B:
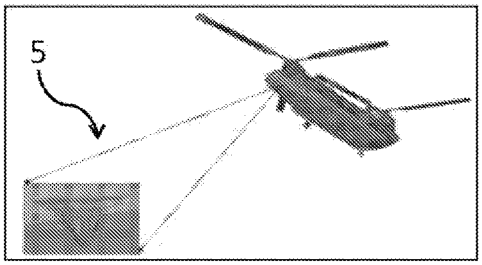
FIG. 11*b* is a perspective view of the orthogonal antenna system having 4 pairs of antennas depicted in FIG. 11*a*, showing the placement of the antenna system on the front underside of a helicopter. The 4 pairs of antennas, in combination in a radar system, provide 360° coverage in azimuth, and from horizon to nadir in elevation.

Referring now to FIG. 11*b*, orthogonal phased array antenna system 5 of the present invention (as described above in FIG. 11*a*) is shown in an exemplary placement on the front underside of a helicopter. The four pairs of antennas, in combination in radar system 3 of the present invention, provide 360° coverage in azimuth, and from horizon to nadir in elevation. As embodied herein, four transmit and four receive linear arrays are integrated into a single blade, which is mounted on the underside of the helicopter. The transmit apertures are mounted conformally to the fuselage while the receive apertures form a blade with orthogonal beams.

Figure 12:
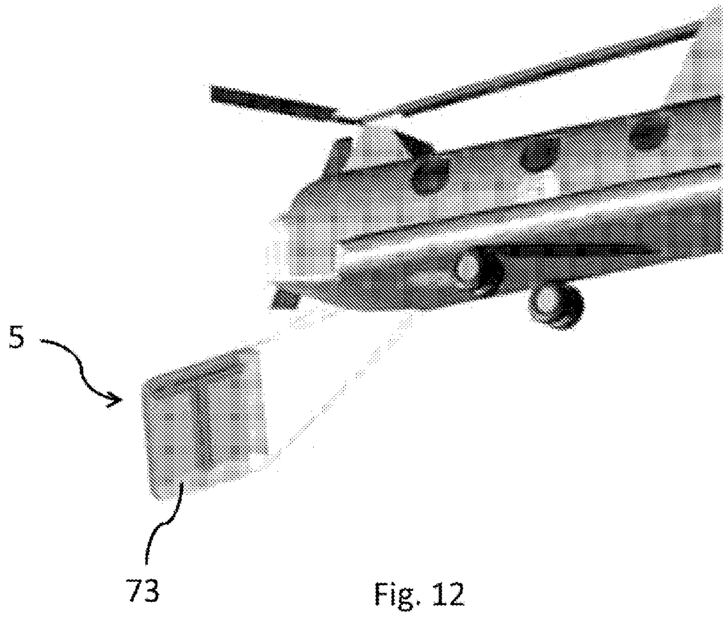
FIG. 12 is a perspective view of an orthogonal antenna system having 3 pairs of antennas, each pair comprising two linear phased array antennas encased in a conformal radome, wherein one aperture of each pair is a transmit aperture and the other aperture is an orthogonally-oriented receive aperture, according a sixth alternate embodiment of the present invention. This view shows the placement of the 3 radomes on a helicopter, wherein one pair is located on the front underside, one pair on the left side, and one pair on the right side. Each pair of antennas provides a 120° field of view.

Referring now to FIG. 12, orthogonal antenna system 5, having at least three pairs of antennas, each pair comprising two linear phased array antennas encased in conformal radome 73 (as described above in FIGS. 9 and 10), is shown in an exemplary placement wherein a first antenna system 5 is located conformally on the front underside, a second antenna system 5 is located conformally on the left side, and a third antenna system 5 is located conformally on the right side of a helicopter. As shown with three pairs of antennas, each pair provides a 120° field of view.

Figure 13A:
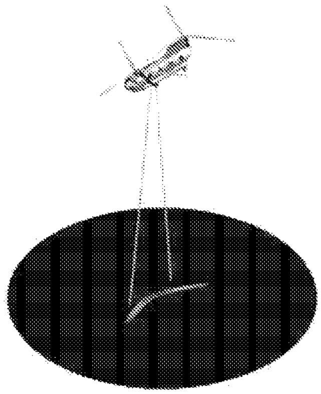
FIG. 13*a* is a perspective simulation of the beam footprint of a first orthogonal aperture of a linear transmit receive radar system installed on a helicopter, according to a second alternate embodiment of the present invention.
Figure 13B:
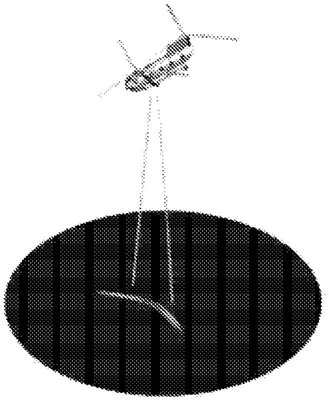
FIG. 13*b* is a perspective simulation of the beam footprint of a second aperture of a linear transmit receive radar system installed on a helicopter, orthogonal to the first aperture, according to a second alternate embodiment of the present invention.
Figure 13C:
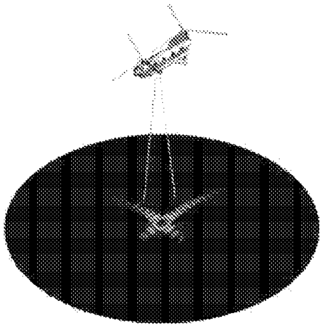
FIG. 13*c* is a perspective simulation of the spot beam footprint resulting from the cross-product of the transmit and receive apertures of a linear transmit receive radar system installed on a helicopter, according to a second alternate embodiment of the present invention.

Referring now to FIG. 13*a*, a perspective simulation is shown of the beam footprint on the ground of a first single aperture of a preferred embodiment of orthogonal linear transmit receive radar system 3 installed on a helicopter. In FIG. 13*b*, a perspective simulation is shown of the beam footprint on the ground of a second single aperture, oriented orthogonally to the aperture of FIG. 13*a*, of a preferred embodiment of orthogonal linear transmit receive radar system 3 installed on a helicopter. As embodied herein, one of the apertures is a transmit array and the other aperture is a receive array. In FIG. 13*c*, a perspective simulation is shown of the spot beam footprint on the ground resulting from the cross-product of the transmit and receive apertures of FIGS. 13*a* and 13*b*, of a preferred embodiment of orthogonal linear transmit receive radar system 3 installed on a helicopter.

Figure 14:
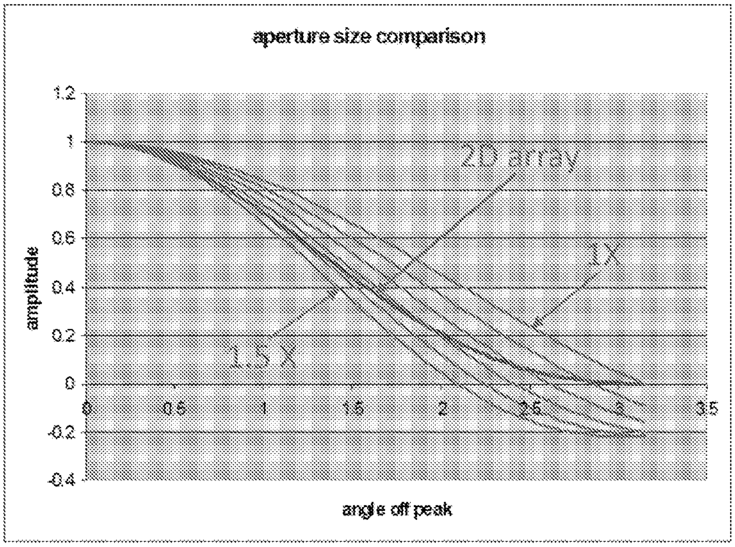
FIG. 14 depicts a graph comparing the aperture size of a prior art 2D filled phased array antenna with the cross-product spot beam of an orthogonal linear transmit receive phased array antenna of lengths 1 to 1.5 times that of the 2D array, according to a second alternate embodiment of the present invention.

Referring now to FIG. 14, a graph is shown depicting a series of curves comparing a 2D scanned array shown in "Red" with a series of different size orthogonal linear transmit receive array systems 5 shown in "Blue", according to a preferred embodiment of the present invention. The horizontal axis "Amplitude" is the normalized off beam of the antennas while the vertical axis "Angle Off Peak" is the normalized electric field. The longer the orthogonal array (linear 1D array 14 or 15), the narrower the resulting beam is, as shown by the series of curves. The conventional 2D array results in higher resolution (narrower beamwidth) due to the product of the two pencil beams in both planes from the receive and transmit apertures. In the present invention, the product of the orthogonal fan beams results in a wider beam with lower resolution. Resolution may be increased, however, by increasing the length of the 1D arrays of the present invention. Analysis shows that a linear 1D array 14 or 15, according to a preferred embodiment of the present invention, with linear length of 1.35 times that of a square 2D array, has the equivalent two-way beam and sidelobe structure of the 2D array.

Figure 15:
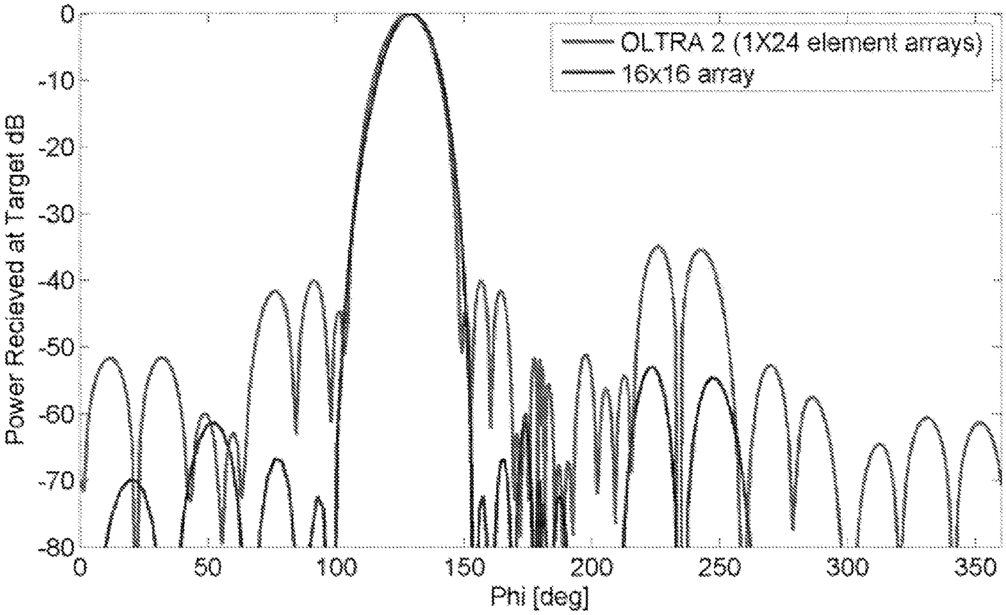
FIG. 15 depicts a graph comparing the main beam and sidelobe levels of a prior art 16×16 phased array antenna with an orthogonal linear transmit receive phased array antenna having two 1×24 elements, according to a second alternate embodiment of the present invention.

Referring now to FIG. 15, a graph is shown that compares the main beam and sidelobe levels of a prior art 16×16 (2D filled) phased array antenna (in blue) with that of orthogonal linear transmit receive phased array antenna system 5 having two 1×24 elements (in red), according to a preferred embodiment of the present invention. FIG. 15 depicts a numerical comparison, as power received at target dB, of the present invention and prior art 2D filled array in the Iso-range when both arrays are scanned to 45°. The sidelobe and clutter induced by the present invention, although higher than the 2D array, is nonetheless very low. The main beam and resolution of the 2 radars is nearly identical.

Figure 16:
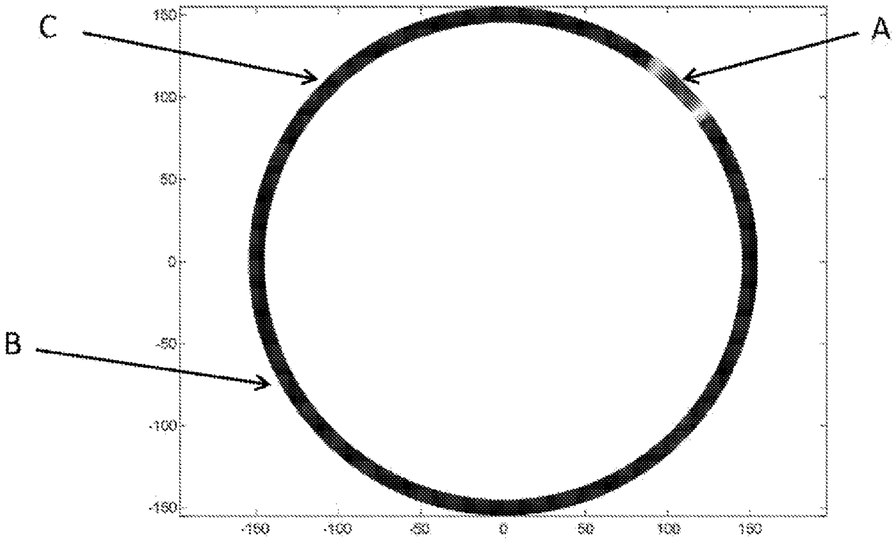
FIG. 16 depicts a graph of iso-range contour at maximum scan angle, showing the clutter induced from sidelobe levels of an orthogonal linear transmit receive phased array antenna according to a second alternate embodiment of the present invention.
Figure 17A:
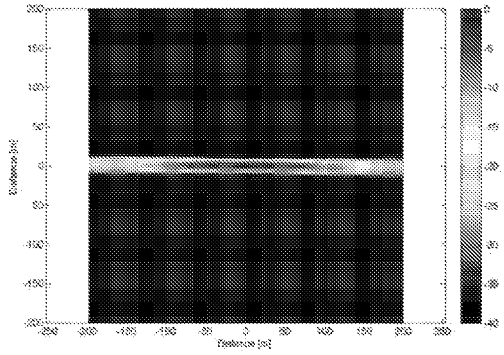
FIG. 17*a* depicts the beam footprint at 0° steer.
Figure 17B:
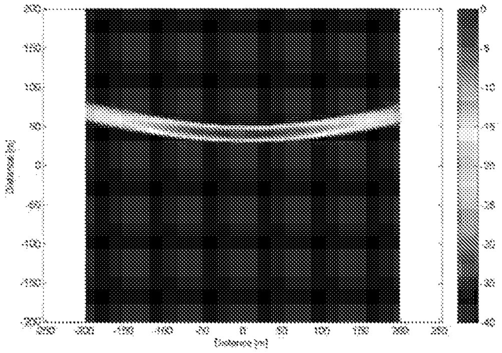
FIG. 17*b* depicts the beam footprint at 15° steer.
Figure 17C:
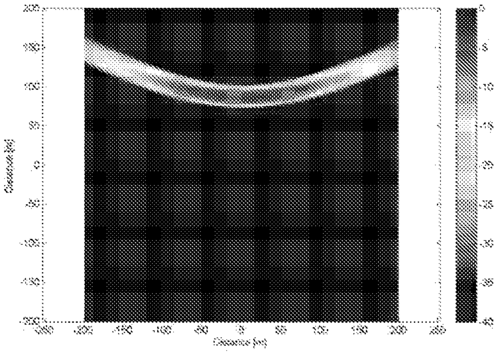
FIG. 17*c* depicts the beam footprint at 30° steer.
Figure 17D:
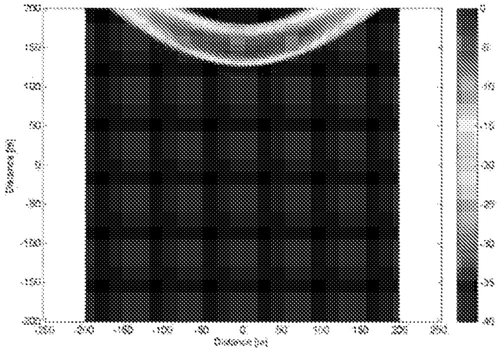
FIG. 17*d* depicts the beam footprint at 45° steer.
Figure 18A:
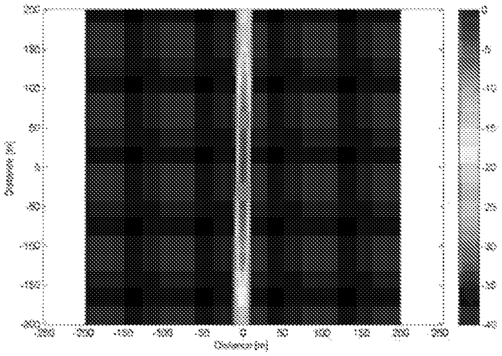
FIG. 18*a* depicts the beam footprint at 0° steer.
Figure 18B:
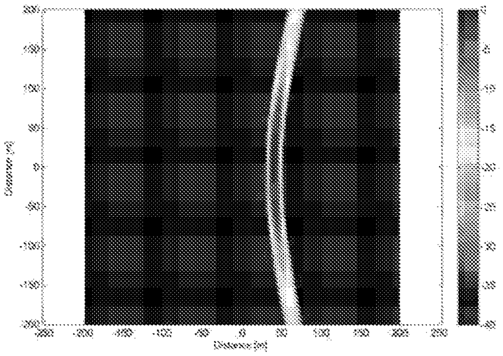
FIG. 18*b* depicts the beam footprint at 15° steer.
Figure 18C:
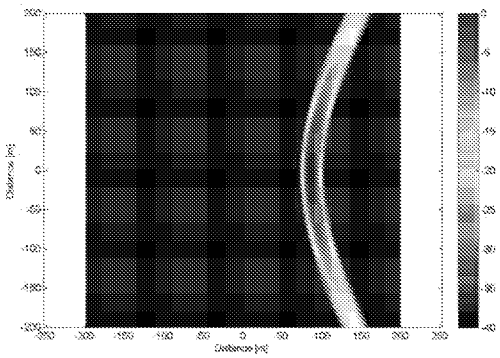
FIG. 18*c* depicts the beam footprint at 30° steer.
Figure 18D:
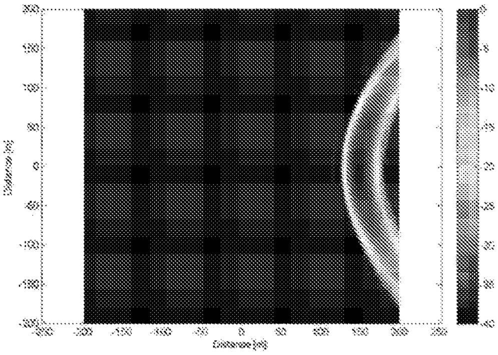
FIG. 18*d* depicts the beam footprint at 45° steer.

Referring now to FIG. 16, a graph is shown illustrating low clutter that is induced by a preferred embodiment of orthogonal linear transmit receive radar system 3 installed on a helicopter. FIG. 16 depicts the illumination of ground in a ring of equal range distances (iso-range) that are approximately at 150 meters from the projection of the helicopter. Sidelobes in this ring can induce errors in the altimeter measurement, which is detrimental to radar effectiveness. Applicant has closely studied the impact of the sidelobes and clutter induced by the present invention, in order numerically to compare the impact on range errors. The two-way product of the transmit and receive beams is highlighted. The arrow at "A" points to the main beam of orthogonal linear transmit receive radar system 3. The arrow at "B" shows that the circle represents all equal (iso) range distances to the beam. The arrow at "C" indicates that clutter, induced by excessive sidelobes from the cross-product of the beams of a preferred embodiment of orthogonal linear transmit receive radar system 3, is very low.

Referring now to FIG. 17, a series of graphs depicts the beam footprint, projected onto the ground, that is produced by a single linear phased array aperture (preferably first linear 1D array 14) oriented to vertical at 150 meters above ground, according to a preferred embodiment of the present invention. FIG. 17*a* depicts the beam footprint at 0° steer. FIG. 17*b* depicts the beam footprint at 15° steer. FIG. 17*c* depicts the beam footprint at 30° steer. FIG. 17*d* depicts the beam footprint at 45° steer.

Referring now to FIG. 18, a series of graphs depicts the beam footprint, projected onto the ground, that is produced by a single linear phased array aperture (preferably second linear 1D array 15) oriented to horizontal at 150 meters above ground, according to a preferred embodiment of the present invention. FIG. 18*a* depicts the beam footprint at 0° steer. FIG. 18*b* depicts the beam footprint at 15° steer. FIG. 18*c* depicts the beam footprint at 30° steer. FIG. 18*d* depicts the beam footprint at 45° steer.

Referring now to FIGS. 19-28, a series of graphs depicts the beam footprint, in units of received power at target, that is produced by the cross-product of the 1×24 element vertical and 1×24 element horizontal apertures of orthogonal linear transmit receive phased array antenna system 5 at 150 meters above ground, according to a preferred embodiment of the present invention, compared with the beam footprint of a prior art 16×16 element 2D array.

Figure 19A:
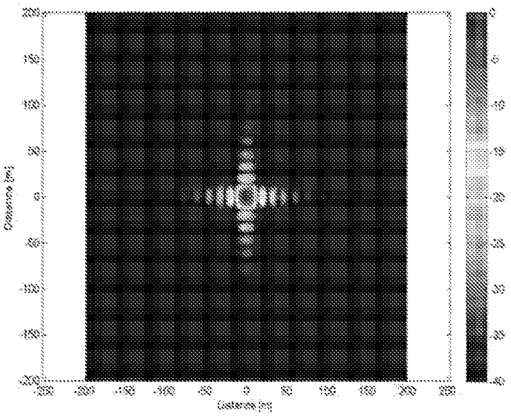
FIG. 19*a* depicts the orthogonal linear transmit receive phased array beam footprint at 0°,0° steer.
Figure 19B:
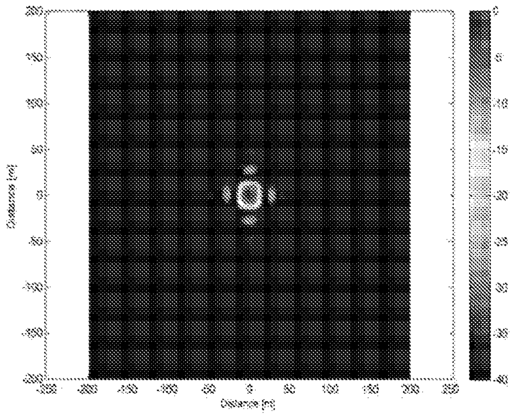
FIG. 19*b* depicts the 16×16 element 2D array beam footprint at 0°,0° steer.

Referring now to FIG. 19*a*, the graph depicts orthogonal linear transmit receive phased array system 5 beam footprint at 0°,0° steer. FIG. 19*b* depicts the 16×16 element 2D array beam footprint at 0°,0° steer.

Figure 20A:
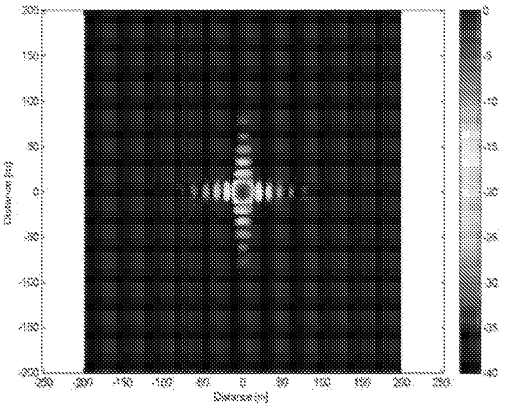
FIG. 20*a* depicts the orthogonal linear transmit receive phased array beam footprint at 0°,15° steer.
Figure 20B:
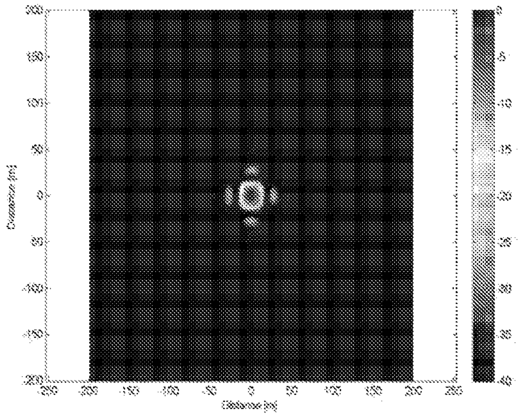
FIG. 20*b* depicts the 16×16 element 2D array beam footprint at 0°,15° steer.

Referring now to FIG. 20*a*, the graph depicts orthogonal linear transmit receive phased array system 5 beam footprint at 0°,15° steer. FIG. 20*b* depicts the 16×16 element 2D array beam footprint at 0°,15° steer.

Figure 21A:
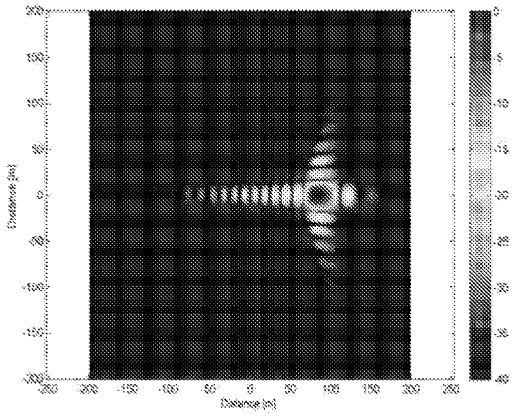
FIG. 21*a* depicts the orthogonal linear transmit receive phased array beam footprint at 0°,30° steer.
Figure 21B:
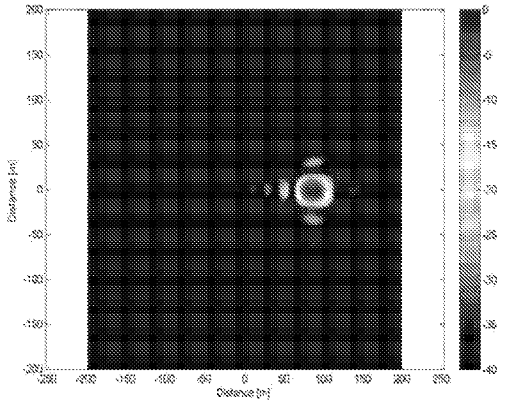
FIG. 21*b* depicts the 16×16 element 2D array beam footprint at 0°,30° steer.

Referring now to FIG. 21*a*, the graph depicts orthogonal linear transmit receive phased array system 5 beam footprint at 0°,30° steer. FIG. 21*b* depicts the 16×16 element 2D array beam footprint at 0°,30° steer.

Figure 22A:
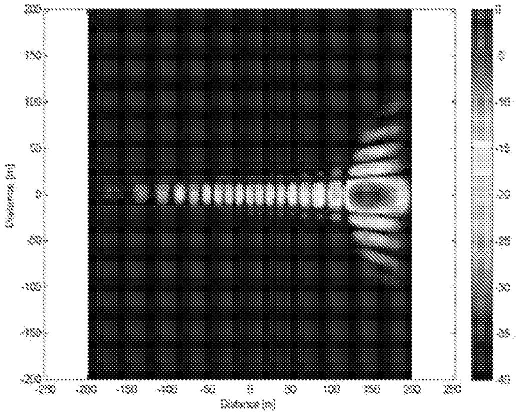
FIG. 22*a* depicts the orthogonal linear transmit receive phased array beam footprint at 0°,45° steer.
Figure 22B:
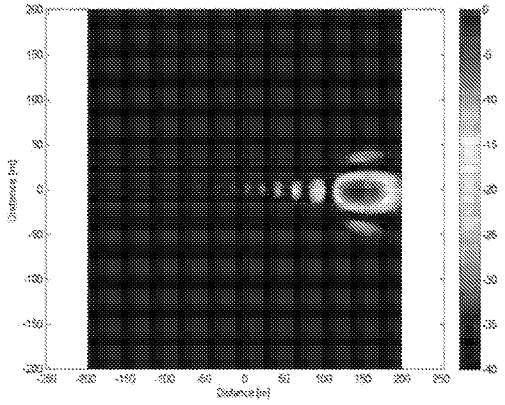
FIG. 22*b* depicts the 16×16 element 2D array beam footprint at 0°,45° steer.

Referring now to FIG. 22*a*, the graph depicts orthogonal linear transmit receive phased array system 5 beam footprint at 0°,45° steer. FIG. 22*b* depicts the 16×16 element 2D array beam footprint at 0°,45° steer.

Figure 23A:
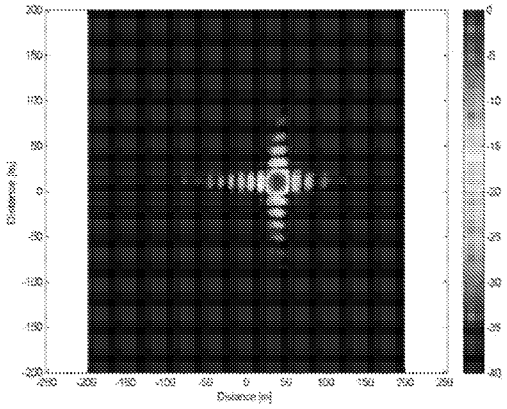
FIG. 23*a* depicts the orthogonal linear transmit receive phased array beam footprint at 15°,15° steer.
Figure 23B:
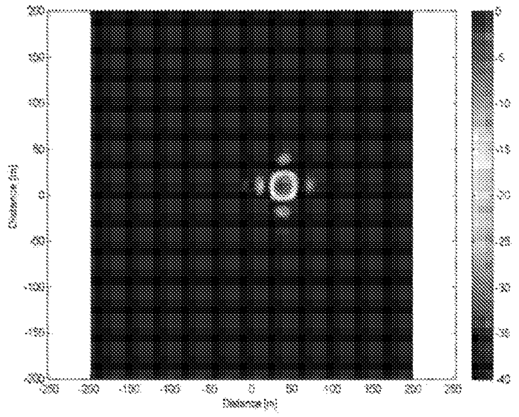
FIG. 23*b* depicts the 16×16 element 2D array beam footprint at 15°,15° steer.

Referring now to FIG. 23*a*, the graph depicts orthogonal linear transmit receive phased array system 5 beam footprint at 15°,15° steer. FIG. 23*b* depicts the 16×16 element 2D array beam footprint at 15°,15° steer.

Figure 24A:
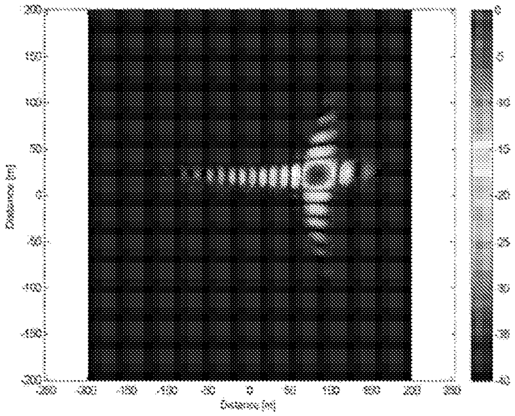
FIG. 24*a* depicts the orthogonal linear transmit receive phased array beam footprint at 15°,30° steer.
Figure 24B:
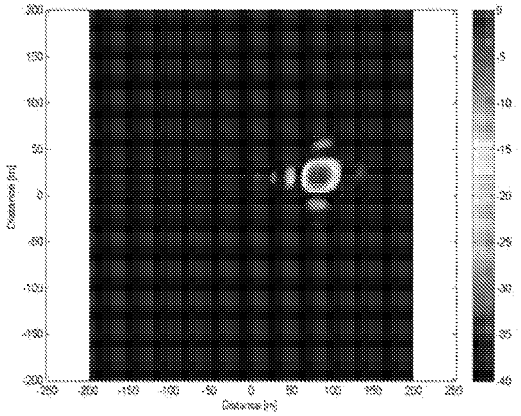
FIG. 24*b* depicts the 16×16 element 2D array beam footprint at 15°,30° steer.

Referring now to FIG. 24*a*, the graph depicts orthogonal linear transmit receive phased array system 5 beam footprint at 15°,30° steer. FIG. 24*b* depicts the 16×16 element 2D array beam footprint at 15°,30° steer.

Figure 25A:
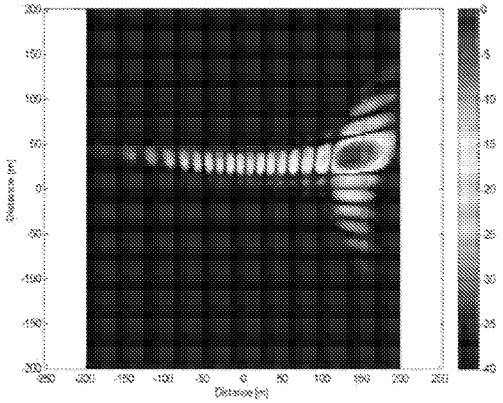
FIG. 25*a* depicts the orthogonal linear transmit receive phased array beam footprint at 15°,45° steer.
Figure 25B:
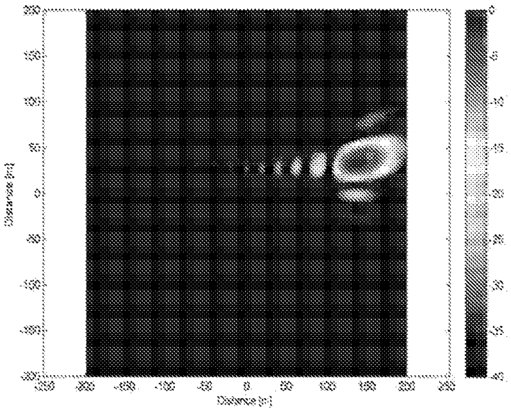
FIG. 25*b* depicts the 16×16 element 2D array beam footprint at 15°,45° steer.

Referring now to FIG. 25*a*, the graph depicts orthogonal linear transmit receive phased array system 5 beam footprint at 15°,45° steer. FIG. 25*b* depicts the 16×16 element 2D array beam footprint at 15°,45° steer.

Figure 26A:
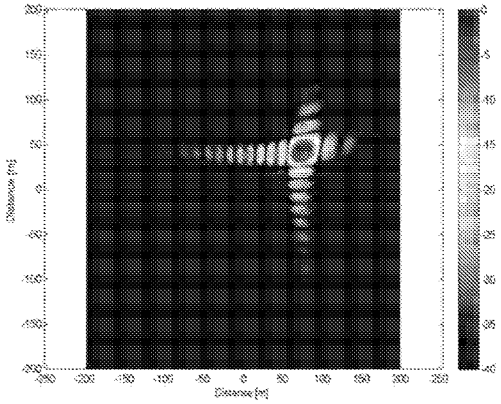
FIG. 26*a* depicts the orthogonal linear transmit receive phased array beam footprint at 30°,30° steer.
Figure 26B:
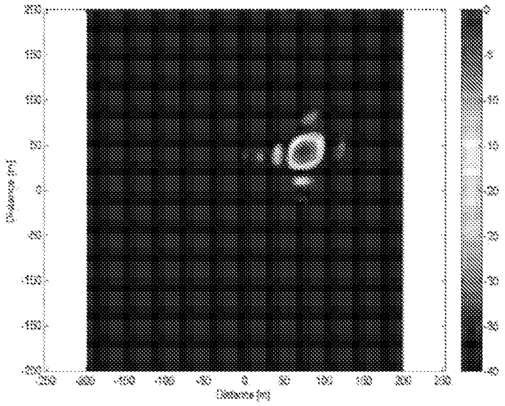
FIG. 26*b* depicts the 16×16 element 2D array beam footprint at 30°,30° steer.

Referring now to FIG. 26*a*, the graph depicts orthogonal linear transmit receive phased array system 5 beam footprint at 30°,30° steer. FIG. 26*b* depicts the 16×16 element 2D array beam footprint at 30°,30° steer.

Figure 27A:
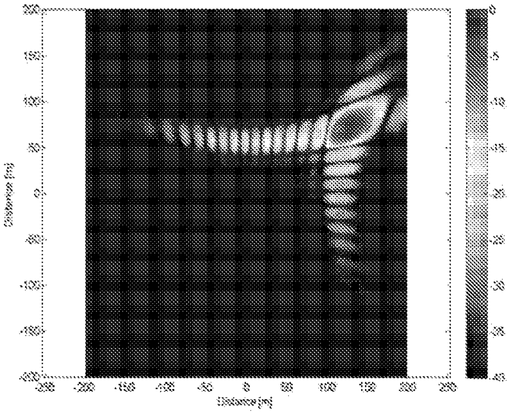
FIG. 27*a* depicts the orthogonal linear transmit receive phased array beam footprint at 30°,45° steer.
Figure 27B:
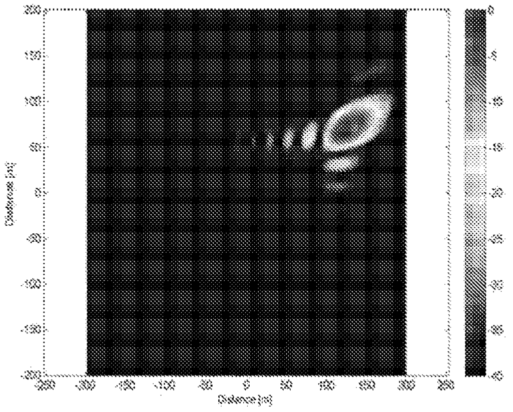
FIG. 27*b* depicts the 16×16 element 2D array beam footprint at 30°,45° steer.

Referring now to FIG. 27*a*, the graph depicts orthogonal linear transmit receive phased array system 5 beam footprint at 30°,45° steer. FIG. 27*b* depicts the 16×16 element 2D array beam footprint at 30°,45° steer.

Figure 28A:
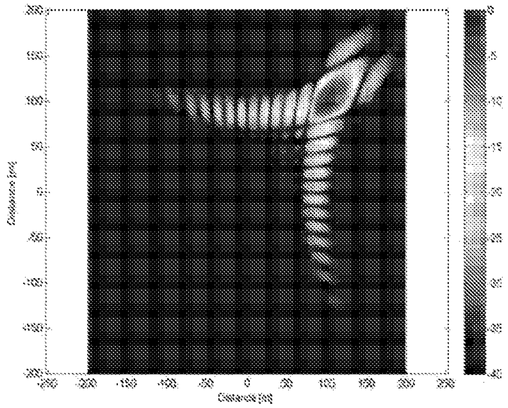
FIG. 28*a* depicts the orthogonal linear transmit receive phased array beam footprint at 45°,45° steer.
Figure 28B:
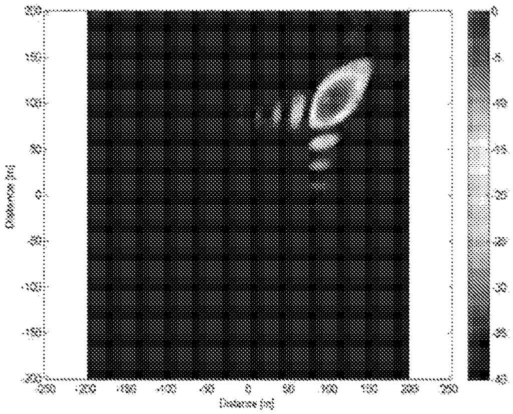
FIG. 28*b* depicts the 16×16 element 2D array beam footprint at 45°,45° steer.

Referring now to FIG. 28*a*, the graph depicts orthogonal linear transmit receive phased array system 5 beam footprint at 45°,45° steer. FIG. 28*b* depicts the 16×16 element 2D array beam footprint at 45°,45° steer.

Figure 29A:
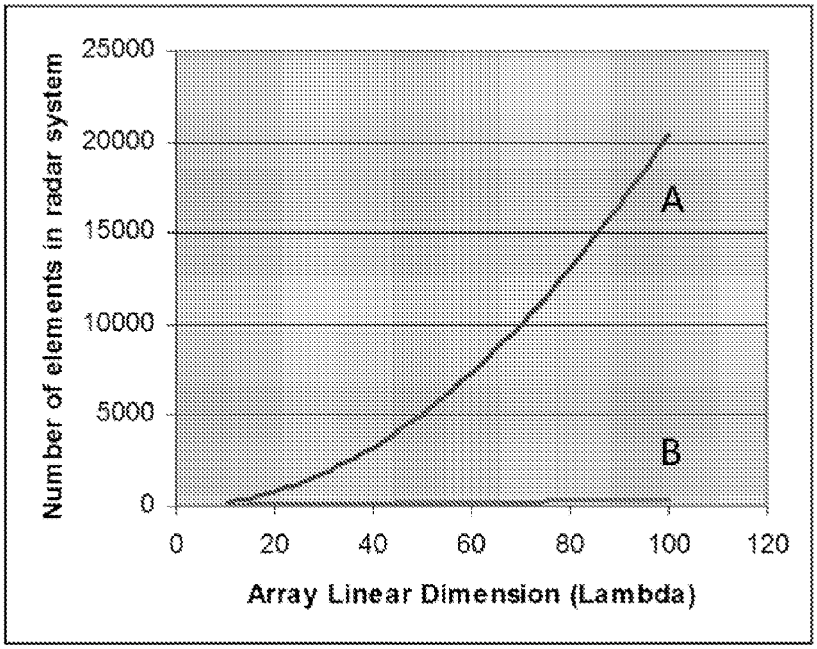
FIG. 29*a* depicts a graph showing the relationship between aperture size and the number of elements required by (A) a 2D filled phased array radar system and (B) a radar system with an orthogonal antenna system having a linear receive phased array aperture and an orthogonally-oriented linear transmit phased array aperture according to a second alternate embodiment of the present invention.

Referring now to FIG. 29*a*, the graph depicts the relationship between aperture size and the number of elements required by (A) a 2D filled phased array radar system and (B) a radar system with orthogonal antenna system 5 having a linear 1D receive phased array aperture 15 and orthogonally-oriented linear 1D transmit phased array aperture 14 according to a preferred embodiment of the present invention. The cost per element "m" of orthogonal linear 1D array follows an "m+m" curve, whereas the cost of a 2D filled array follows a geometric curve ("$m^2$"), showing that that the cost savings of the present invention array are geometric.

Figure 29B:
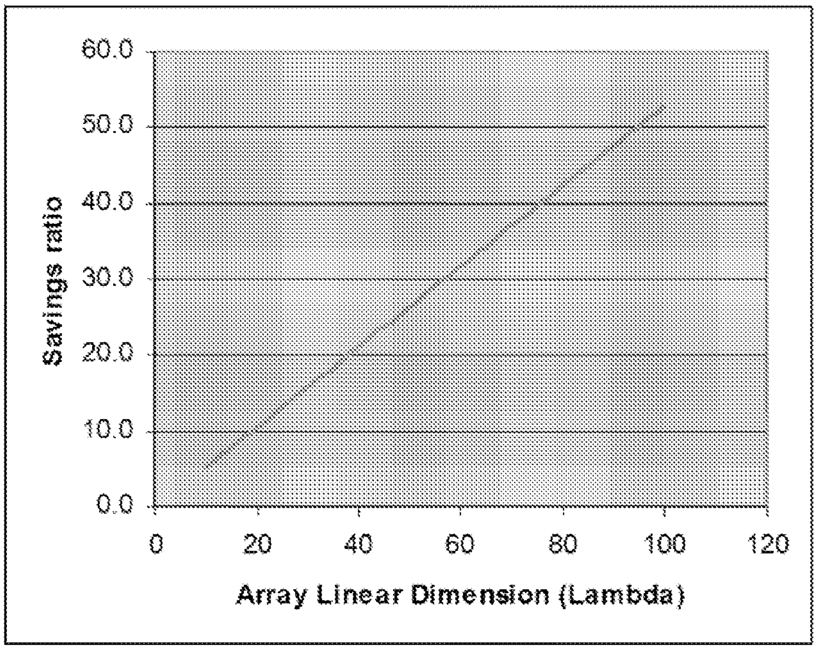
FIG. 29*b* depicts a graph showing the cost savings ratio for various linear array dimensions, according to a second alternate embodiment of the present invention.

Referring now to FIG. 29*b*, the graph depicts the cost savings ratio for various linear array dimensions, according to a preferred embodiment of the present invention.

What is claimed is:

1. A radar system having an orthogonal antenna system, wherein said orthogonal antenna system comprises at least one transmit aperture producing a transmit beam and at least one receive aperture producing a receive beam, wherein said at least one transmit aperture is substantially orthogonal to said at least one receive aperture, wherein said transmit beam is narrow in a first dimension and wide in a second dimension, and said receive beam is wide orthogonally to said first dimension and narrow orthogonally to said second dimension, wherein a composite narrow beam cross-product results from an intersection of said transmit beam with said receive beam, and wherein said orthogonal antenna system, having a linear length of between 1.0 and 1.5 times that of a fully populated square 2D scan array, generates said composite narrow beam cross-product that is substantially the same resolution as said fully populated square 2D scan array.

2. The radar system according to claim 1, wherein said at least one transmit aperture and said at least one receive aperture are provided in a horn, pill box, planar, dielectric lens, dielectric rod, Cassegrain, parabolic, elliptical, circular dish or linear shape.

3. The radar system according to claim 1, wherein said orthogonal antenna system comprises at least one transmit aperture that rotates on a first one-axis gimbal and at least one receive aperture that rotates on a second one-axis gimbal in a plane orthogonal to said at least one transmit aperture.

4. The radar system according to claim 1, wherein said orthogonal antenna system comprises at least one transmit aperture that comprises at least one linear phased array and at least one receive aperture that comprises at least one linear phased array.

5. The radar system according to claim 4, wherein said at least one linear phased array transmit aperture and said at least one linear phased array receive aperture each further comprises a plurality of antenna elements disposed on an array face and connected by a combining network, and wherein each of said antenna elements further comprises a radiator and a phase shifter.

6. The radar system according to claim 5, wherein said at least one linear phased array transmit aperture and said at least one linear phased array receive aperture are scanned via mechanical scanning, electronic beam switching, electronically scanned phased array or digital beamforming.

7. The radar system according to claim 6, wherein said orthogonal antenna system provides high resolution imaging at a microwave frequency.

8. The radar system according to claim 6, wherein said orthogonal antenna system provides high resolution imaging at a millimeter wave frequency.

9. The radar system according to claim 1, wherein said at least one transmit aperture is switched to operate in a receive mode and said at least one receive aperture is simultaneously switched to operate in a transmit mode.

10. The radar system according to claim 9, wherein said at least one transmit aperture and said at least one receive aperture are provided in a horn, pill box, planar, dielectric lens, dielectric rod, Cassegrain, parabolic, elliptical, circular dish or linear shape.

11. The radar system according to claim 9, wherein said orthogonal antenna system comprises at least one transmit aperture that rotates on a first one-axis gimbal and at least one receive aperture that rotates on a second one-axis gimbal in a plane orthogonal to said at least one transmit aperture.

12. The radar system according to claim 9, wherein said orthogonal antenna system comprises at least one transmit aperture that comprises at least one linear phased array and at least one receive aperture that comprises at least one linear phased array.

13. The radar system according to claim 12, wherein said at least one linear phased array transmit aperture and said at least one linear phased array receive aperture each further comprises a plurality of antenna elements disposed on an array face and connected by a combining network, and wherein each of said antenna elements further comprises a radiator and a phase shifter.

14. The radar system according to claim 13, wherein said at least one linear phased array transmit aperture and said at least one linear phased array receive aperture are scanned via mechanical scanning, electronic beam switching, electronically scanned phased array or digital beamforming.

15. The radar system according to claim 14, wherein said orthogonal antenna system provides high resolution imaging at a microwave frequency.

16. The radar system according to claim 14, wherein said orthogonal antenna system provides high resolution imaging at a millimeter wave frequency.

* * * * *